(12) United States Patent
Ishida et al.

(10) Patent No.: US 6,950,889 B2
(45) Date of Patent: Sep. 27, 2005

(54) DATA TRANSFER CONTROL DEVICE AND ELECTRONIC INSTRUMENT

(75) Inventors: Takuya Ishida, Sapporo (JP); Yoshiyuki Kamihara, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 449 days.

(21) Appl. No.: 09/983,971

(22) Filed: Oct. 26, 2001

(65) Prior Publication Data

US 2002/0059488 A1 May 16, 2002

(30) Foreign Application Priority Data

Oct. 31, 2000 (JP) ........................................ 2000-332492

(51) Int. Cl.$^7$ ................................................ G06F 3/00
(52) U.S. Cl. ........................... 710/65; 710/66; 709/246; 341/50; 341/100; 341/101
(58) Field of Search ..................... 710/65, 66; 709/246; 341/50, 100, 101

(56) References Cited

U.S. PATENT DOCUMENTS

| | | | | |
|---|---|---|---|---|
| 5,083,286 A | * | 1/1992 | Hino et al. | 358/1.16 |
| 5,162,795 A | * | 11/1992 | Shirota | 341/67 |
| 5,889,936 A | * | 3/1999 | Chan | 714/39 |
| 6,218,969 B1 | * | 4/2001 | Watson et al. | 341/100 |

FOREIGN PATENT DOCUMENTS

| | | | | |
|---|---|---|---|---|
| JP | 5-250140 | 9/1993 | | |
| JP | 406103025 A | * | 4/1994 | G06F/5/00 |
| JP | 9-161400 | 6/1997 | | |
| JP | 11-98022 | 4/1999 | | |

OTHER PUBLICATIONS

U.S. Appl. No. 09/805,029, filed Mar. 14, 2001, Ishida.

USB2.0 Transceiver Macrocell Interface (UTMI) Specification, Version 1.0rc Apr. 25, 2000.

* cited by examiner

*Primary Examiner*—Fritz Fleming
*Assistant Examiner*—Justin Knapp
(74) *Attorney, Agent, or Firm*—Oliff & Berridge, PLC

(57) ABSTRACT

A data transfer control device and an electronic instrument which can implement a process to be made on data transmitted and received through a high speed bus on a circuit operating at a low frequency. The data transfer control device has a conversion circuit which converts K-bit width data transferred at a frequency FC1 (in USB 2.0 HS mode) through a bus into data having an L-bit width (L>K) by rearranging, and a processing circuit which receives the L-bit width data from the conversion circuit and carries out a K-bit based process on an L-bit basis at a frequency FC2 lower than FC1. This enables to perform the K-bit based process at the low frequency FC2. Configuration on a transmission end can be implemented in the same manner. The transfer data in the USB 2.0 HS mode is processed on the L-bit basis while the transfer data in the FS mode is processed on the K-bit basis. The present invention is applicable also to the process on data transferred through a bus under the IEEE1394 or SCSI.

13 Claims, 32 Drawing Sheets

RECEPTION

FIG. 13A NRZI
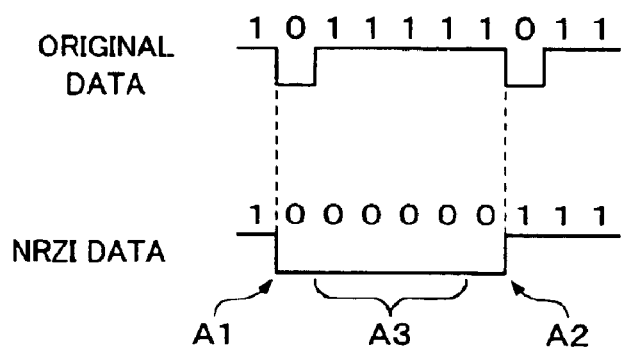
FIG. 13B BIT STUFFING
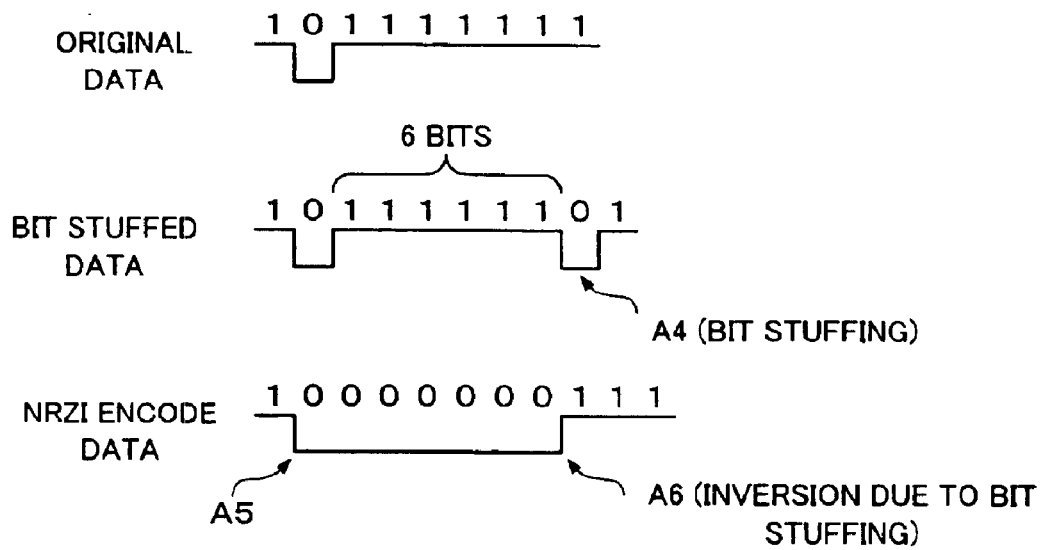

FIG. 16 RX END

NRZI ENCODE COMPUTATION ially have required connection by# DATA TRANSFER CONTROL DEVICE AND ELECTRONIC INSTRUMENT Japanese Patent Application No. 2000-332492, filed on Oct. 31, 2000, is hereby incorporated by reference in its entirety.

TECHNICAL FIELD

The present invention relates to a data transfer control device and an electronic instrument.

BACKGROUND

In recent years, attentions have been drawn to the USB (Universal Serial Bus) as an interface standard for connection between a personal computer and peripheral units (broadly, electronic instruments). The USB has a merit that connection by the connector of the same standard can be made with peripheral units, such as a mouse, a keyboard and a printer, that conventionally have required connection by the connectors of different standards, and further so-called plug-&-play or hot-plug is possible to realize.

Meanwhile, the USB has a drawback to low transfer speed as compared to that of the IEEE1394 in the spotlight as also the serial bus interface standard.

In such circumstance, the USB2.0 Standard has been plotted and highlighted to attain a data transfer rate of 480 Mbps (HS mode) by far higher compared to that of the USB1.1 while possessing lower compatibility with the conventional USB1.1 Standard. Furthermore, the UTMI (USB2.0 Transceiver Macrocell Interface) have been plotted to define the interface specifications on the USB2.0 physical-layer and logical-layer circuits.

SUMMARY

According to a first aspect of the present invention, there is provided a data transfer control device for data transfer through a bus, comprising:

a conversion circuit which converts K-bit width data transferred at a first frequency through a bus into data having an L-bit width (L>K) by rearranging; and a processing circuit which receives the L-bit width data from the conversion circuit and carries out a K-bit based process on an L-bit basis at a second frequency which is lower than the first frequency.

According to a second aspect of the present invention, there is provided a data transfer control device for data transfer through a bus, comprising:

a first conversion circuit which converts K-bit width data transferred in a high-speed first transfer mode through a bus into data having an L-bit width (L>K) by rearranging;

a first processing circuit which receives the L-bit width data from the first conversion circuit and carries out a K-bit based process on an L-bit basis at a second frequency which is lower than a first frequency of the first transfer mode;

a second processing circuit which processes on a K-bit basis a K-bit width data transferred in a low-speed second transfer mode through a bus; and a second conversion circuit which converts the K-bit width data from the second processing circuit into data having an L-bit width.

According to a third aspect of the present invention, there is provided a data transfer control device for data transfer through a bus, comprising:

a first conversion circuit which converts K-bit width data transferred in a high-speed first transfer mode through a bus into data having an L-bit width (L>K) by rearranging;

a second conversion circuit which converts K-bit width data transferred in a low-speed second transfer mode through a bus into data having an L-bit width by rearranging;

a selection circuit which selects and outputs one of an output from the first conversion circuit and an output from the second conversion circuit; and a processing circuit which receives the L-bit width data from the selection circuit and performs a K-bit based process on an L-bit basis at a second frequency which is lower than a first frequency of the first transfer mode.

According to a fourth aspect of the present invention, there is provided a data transfer control device for data transfer through a bus, comprising:

a first conversion circuit which converts K-bit width data transferred at a first frequency through a bus into data having an L-bit width (L>K) by rearranging;

a processing circuit which receives the L-bit width data from the first conversion circuit and carries out an M-bit based process (L>M>K) on an L-bit basis at a second frequency which is lower than the first frequency; and a second conversion circuit which receives the L-bit width data from the processing circuit and converts the L-bit width data into data having an M-bit width by rearranging.

According to a fifth aspect of the present invention, there is provided a data transfer control device for data transfer through a bus, comprising:

a processing circuit which receives data to be transferred on a K-bit basis at a first frequency through a bus as L-bit width data (L>K) and carries out a K-bit based process on an L-bit basis at a second frequency which is lower than the first frequency; and a conversion circuit which converts the L-bit width data from the processing circuit into data having a K-bit width by rearranging.

According to a sixth aspect of the present invention, there is provided a data transfer control device for data transfer through a bus, comprising:

a first processing circuit which receives data to be transferred on a K-bit basis in a high-speed first transfer mode through a bus as L-bit width data (L>K) and carries out a K-bit based process on an L-bit basis at a second frequency which is lower than a first frequency of the first transfer mode; and a first conversion circuit which converts the L-bit width data from the first processing circuit into data having a K-bit width by rearranging;

a second conversion circuit which receives data to be transferred on the K-bit basis in a low-speed second transfer mode through a bus as L-bit width data and converts the L-bit width data into a K-bit width data by rearranging; and a second processing circuit which processes the K-bit width data from the second conversion circuit on the K-bit basis.

According to a seventh aspect of the present invention, there is provided a data transfer control device for data transfer through a bus, comprising:

a processing circuit which receives data to be transferred on a K-bit basis in a high-speed first transfer mode or a low-speed second transfer mode through a bus as L-bit width data (L>K) and carries out a K-bit based process on an L-bit basis at a second frequency lower than a first frequency of the first transfer mode; and a first conversion circuit which receives the L-bit width data to be transferred in the high-speed first transfer mode from the processing circuit and converts the L-bit width data into data having a K-bit width by rearranging; and a second conversion circuit for receives the L-bit width data to be transferred in the low-speed second transfer mode from the processing circuit and converts the L-bit width data into data having a K-bit width by rearranging.

According to an eighth aspect of the present invention, there is provided a data transfer control device for data transfer through a bus, comprising:

a first conversion circuit which receives data to be transferred on a K-bit basis at a first frequency through a bus as M-bit width data (M>K) and converts the M-bit width data into data having L-bit width (L>M>K) by rearranging;

a processing circuit which receives the L-bit width data from the first conversion circuit and carries out an M-bit based process on an L-bit basis at a second frequency lower than the first frequency; and a second conversion circuit which converts the L-bit width data from the processing circuit into data having a K-bit width by rearranging.

BRIEF DESCRIPTION OF THE DRAWINGS

FIGS. 13A and 13B are diagrams for explaining NRZI and bit stuffing;

DETAILED DESCRIPTION OF THE EMBODIMENT

Figure 1:
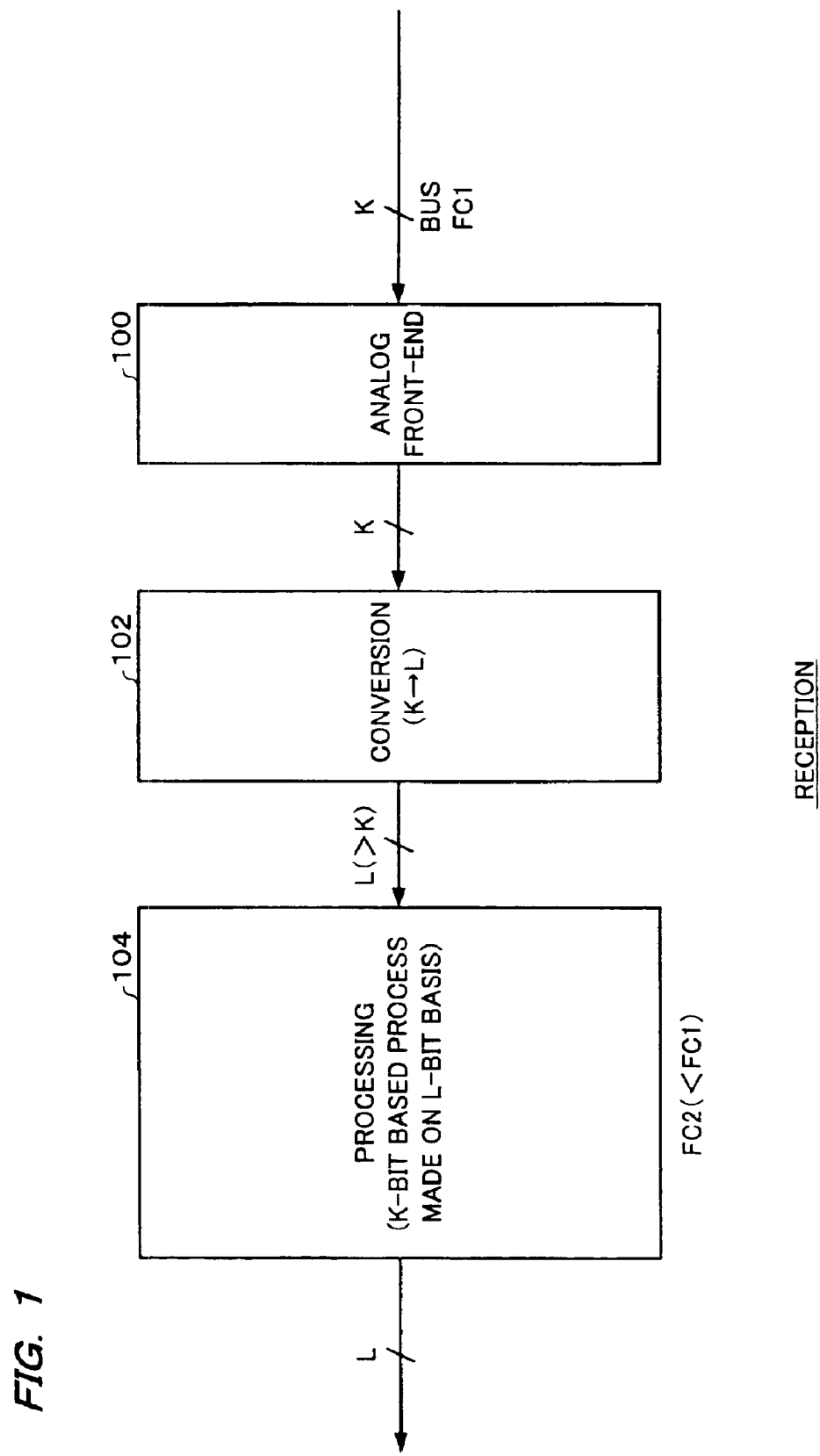
FIG. 1 is a diagram showing a configuration example at a reception end of a data transfer control device of the embodiment.

An embodiment of the present invention will now be explained below.

Note that the embodiment explained below is not to limit the content of the present invention described in the claims. In addition, it should be construed that all the structures as explained in the embodiment be not necessarily requisite as the structural elements of the invention.

In the meanwhile, the USB2.0, carrying out data transfer at 480 Mbps in an HS (High Speed) mode, has a merit of being usable as an interface of a storage such as a hard disk drive and an optical disk drive, requiring a high transfer speed.

However, in the HS mode, the processes of bit unstuffing, bit stuffing, NRZI (Non Return to Zero Invert) decode, NRZI encode and the like required for the USB must be realized on a circuit operable at a clock frequency of 480 MHz. Using a state-of-the-art semiconductor process for microfabrication, such a circuit can be realized operating at 480 MHz. However, a state-of-the-art semiconductor process is impossible to use, such high-speed circuit operation is extremely difficult in realizing.

Meanwhile, as one technique for realizing 480-MHz high-speed circuit operation without the use of a state-of-the-art semiconductor process, there is a technique that circuit arrangement and interconnection is manually made to minimize clock skew, assuring synchronous operation.

However, such manual circuit layout and interconnection incurs prolonged design period and manufacturing cost increase as compared to the efficient circuit design technique making use of HDL (Hardware Description Language) circuit combination or automatic layout interconnection, further preventing the data transfer control device (physical-layer circuit, logic-layer circuit) from being made in a macro cell.

The embodiment of the present invention has been made in view of the foregoing technical problems. The embodiment can provide a data transfer control device and an electronic instrument capable of realizing the process to be made on the transmission and reception data over a high-speed bus on a circuit operating at a low frequency.

In order to solve the above problem, the embodiment is concerned with a data transfer control device for data transfer through a bus, comprising:

a conversion circuit which converts K-bit width data transferred at a first frequency through a bus into data having an L-bit width (L>K) by rearranging; and a processing circuit which receives the L-bit width data from the conversion circuit and carries out a K-bit based process on an L-bit basis at a second frequency which is lower than the first frequency.

According to the embodiment, the k-bit width data transferred at the first frequency through the bus is converted into data having an L-bit width. The processing circuit receiving the L-bit width data carries out a normally K-bit based process on an L-bit basis at a second frequency lower than the first frequency. Accordingly, according to the embodiment, even where the first frequency as bus transfer frequency is high, the processing circuit is satisfactorily operated at the second frequency lower than the first frequency. Consequently, the process to be made on the K-bit basis can be carried out with time margin, thus properly coping with bus-speed increase.

Also, the embodiment is concerned with a data transfer control device for data transfer through a bus, comprising:

a first conversion circuit which converts K-bit width data transferred in a high-speed first transfer mode through a bus into data having an L-bit width (L>K) by rearranging;

a first processing circuit which receives the L-bit width data from the first conversion circuit and carries out a K-bit based process on an L-bit basis at a second frequency which is lower than a first frequency of the first transfer mode;

a second processing circuit which processes on a K-bit basis a K-bit width data transferred in a low-speed second transfer mode through a bus; and a second conversion circuit which converts the K-bit width data from the second processing circuit into data having an L-bit width.

According to the embodiment, where data is transferred in a high-speed first transfer mode, the first processing circuit carries out a K-bit based process on an L-bit basis at a low second frequency. On the other hand, where data is transferred in a low-speed second transfer mode, the second processing circuit carries out a process on a K-bit basis. Consequently, the embodiment can properly cope with bus-speed increase due to the adoption of a first transfer mode while making use of a circuit designed for the low-speed second transfer mode.

Also, the embodiment of the present invention relates to a data transfer control device for data transfer through a bus, comprising:

a first conversion circuit which converts K-bit width data transferred in a high-speed first transfer mode through a bus into data having an L-bit width (L>K) by rearranging;

a second conversion circuit which converts K-bit width data transferred in a low-speed second transfer mode through a bus into data having an L-bit width by rearranging;

a selection circuit which selects and outputs one of an output from the first conversion circuit and an output from the second conversion circuit; and a processing circuit which receives the L-bit width data from the selection circuit and performs a K-bit based process on an L-bit basis at a second frequency which is lower than a first frequency of the first transfer mode.

According to the embodiment, not only where data is transferred in a high-speed first transfer mode but also where data is transferred in a low-speed second transfer mode, the processing circuit can carry out a K-bit based process on an L-bit basis. Accordingly, the processing circuit can be utilized in both first and second transfer modes thus achieving the scale-reduction of the data transfer control device.

Also, the embodiment is concerned with a data transfer control device for data transfer through a bus, comprising:

a first conversion circuit which converts K-bit width data transferred at a first frequency through a bus into data having an L-bit width (L>K) by rearranging;

a processing circuit which receives the L-bit width data from the first conversion circuit and carries out an M-bit based process (L>M >K) on an L-bit basis at a second frequency which is lower than the first frequency; and a second conversion circuit which receives the L-bit width data from the processing circuit and converts the L-bit width data into data having an M-bit width by rearranging.

According to the embodiment, the K-bit width data transferred at a first frequency through a bus is converted into data having an L-bit width. The processing circuit receiving the L-bit width data carries out a normally M-bit based process on an L-bit basis at a second frequency lower than the first frequency. The second conversion circuit rearranges and converts the processed L-bit width data into data having an M-bit width. Consequently, according to the embodiment, the M-bit based process can be carried out with time margin, thus properly coping with bus-speed increase.

In the embodiment, the conversion circuit or the first conversion circuit may include a data holding circuit which receives and holds data inputted at the first frequency; a judging circuit which judges whether or not the data held in the data holding circuit is valid, by unit of a data cell configured of a plurality of bits; and a circuit which receives data of a data cell from the data holding circuit and outputs the data of a data cell that has been judged to be valid at the second frequency which is lower than the first frequency.

According to the embodiment, when data is inputted at a first frequency, this is held in the data holding circuit. Whether the data is valid or not is judged by unit of a data cell. The data cell judged to be valid is outputted at a second frequency lower than the first frequency.

According to the embodiment, inputted data is outputted on a data-cell basis, thus realizing a conversion circuit having the both of a data converting function and a buffer function for absorbing (compensating) clock frequency difference, phase difference or the like.

Also, the embodiment is concerned with a data transfer control device for data transfer through a bus, comprising:

a processing circuit which receives data to be transferred on a K-bit basis at a first frequency through a bus as L-bit width data (L>K) and carries out a K-bit based process on an L-bit basis at a second frequency which is lower than the first frequency; and a conversion circuit which converts the L-bit width data from the processing circuit into data having a K-bit width by rearranging.

According to the embodiment, the processing circuit receives the K-bit width data transferred at a first frequency through a bus as an L-bit width data. The processing circuit, receiving the L-bit width data, carries out a normally K-bit based process on an L-bit basis at a second frequency lower than the first frequency. Consequently, according to the embodiment, even where the first frequency as a bus transfer frequency is high, the processing circuit satisfactorily operates at the second frequency lower than the first frequency. Accordingly, the process to be made on the K-bit basis can be carried out with time margin thus properly coping with bus-speed increase.

Also, the embodiment is concerned with a data transfer control device for data transfer through a bus, comprising:

a first processing circuit which receives data to be transferred on a K-bit basis in a high-speed first transfer mode through a bus as L-bit width data (L>K) and carries out a K-bit based process on an L-bit basis at a second frequency which is lower than a first frequency of the first transfer mode; and a first conversion circuit which converts the L-bit width data from the first processing circuit into data having a K-bit width by rearranging;

a second conversion circuit which receives data to be transferred on the K-bit basis in a low-speed second transfer mode through a bus as L-bit width data and converts the L-bit width data into a K-bit width data by rearranging; and a second processing circuit which processes the K-bit width data from the second conversion circuit on the K-bit basis.

According to the embodiment, where transferring data in a high-speed first transfer mode, the first processing circuit carries out a K-bit based process on an L-bit basis at a low second frequency. On the other hand, where transmitting data in a low-speed second transfer mode, the second processing circuit carries out the process on the K-bit basis. Consequently, the embodiment can properly cope with bus-speed increase due to the adoption of a first transfer mode while making use of a circuit designed for a low-speed second transfer mode.

Also, the embodiment is concerned with a data transfer control device for data transfer through a bus, comprising:

a processing circuit which receives data to be transferred on a K-bit basis in a high-speed first transfer mode or a low-speed second transfer mode through a bus as L-bit width data (L>K) and carries out a K-bit based process on an L-bit basis at a second frequency lower than a first frequency of the first transfer mode; and a first conversion circuit which receives the L-bit width data to be transferred in the high-speed first transfer mode from the processing circuit and converts the L-bit width data into data having a K-bit width by rearranging; and a second conversion circuit for receives the L-bit width data to be transferred in the low-speed second transfer mode from the processing circuit and converts the L-bit width data into data having a K-bit width by rearranging.

According to the embodiment, not only where transferring data in a high-speed first transfer mode but also where transferring data in a low-speed second transfer mode, the processing circuit carries out a K-bit based process on an L-bit basis. Consequently, the processing circuit can be utilized in both first and second transfer mode thus achieving the scale reduction of the data transfer control device.

Also, the embodiment is concerned with a data transfer control device for data transfer through a bus, comprising:

a first conversion circuit which receives data to be transferred on a K-bit basis at a first frequency through a bus as M-bit width data (M>K) and converts the M-bit width data into data having L-bit width (L>M>K) by rearranging;

a processing circuit which receives the L-bit width data from the first conversion circuit and carries out an M-bit based process on an L-bit basis at a second frequency lower than the first frequency; and a second conversion circuit which converts the L-bit width data from the processing circuit into data having a K-bit width by rearranging.

According to the embodiment, the first conversion circuit receives the data to be transferred at a first frequency through a bus as an M-bit width data and rearranges and converts the M-bit width data into data having an L-bit width. The processing circuit receiving the L-bit width data carries out a normally M-bit based process on an L-bit basis at a second frequency lower than the first frequency. Consequently, the embodiment can carry out an M-bit based process with time margin thus properly coping with bus-speed increase.

Also, the embodiment of the present invention may carry out data transfer according to the universal serial bus (USB) standard.

This properly realizes the data transfer in an HS mode standardized, for example, under the USB 2.0.

The embodiment of the present invention further provides an electronic instrument comprising: any of the above described data transfer control devices; and a device which performs output processing, taking processing or storing processing of data transferred through the data transfer control device or the bus.

According to the embodiment, because the data transfer control device used in an electronic instrument can be reduced in cost and improved in reliability, the electronic instrument also can be reduced in cost and improved in reliability. Also, the embodiment can carry out data transfer in a high-speed transfer mode hence achieving the process-speed increase in the electronic instrument.

Now, the embodiment of the present invention will be explained below by use of the drawings.

1. FEATURES OF THE EMBODIMENT

1.1 Receiving End Configuration

FIG. 1 shows a configuration example, at a receiving end, of a data transfer control device according to the embodiment.

An analog front-end circuit 100 is an analog circuit including a driver and receiver for data transfer.

The embodiment uses a standard-conforming high-speed bus, e.g. to the USB (Universal Serial Bus), IEEE1394 or SCSI (Small Computer System Interface), to transfer the data having a bit width K at a frequency FC1 (first frequency). The analog front-end circuit 100 receives the K-bit-width data transferred at the frequency FC1. Note that K=1 for example is assigned under the USB or IEEE1394 while K=8, 32 for example is given under the SCSI (SCSI-2). Meanwhile, the frequency FC1 is assigned for example 480 MHz (HS mode) under the USB while it under the IEEE1394 is given for example 400 to 3200 MHz.

A conversion circuit 102 rearranges and converts the K-bit width data from the analog front-end circuit 100 into data having an L (L>K) bit width. For example, where using a serial bus to transfer 1-bit width data on a differential signal as under the USB or IEEE1394, the conversion circuit 102 would be a serial-parallel conversion circuit to convert 1-bit width data (serial data) into parallel data having, for example, an 8-bit width.

A processing circuit 104 receives L-bit width data from the conversion circuit 102 to carry out, on an L-bit basis, a process to be executed on a K-bit basis. At this time, the processing circuit 104 realizes such an L-bit based process with a circuit operation at a frequency FC2 (second frequency) lower than the bus-transfer frequency FC1. Then, the processed L-bit width data is outputted to a rear-staged circuit.

Herein, the process to be executed on the K-bit basis is a process, for example in the bus standard (interface standard), that is defined for execution on the K-bit basis or premised to be executed on the K-bit basis. For example under the USB (UTMI), the process of bit unstuffing, bit stuffing, NRZI (Non Return to Zero Invert) decode or NRZI encode is premised to be executed on a 1-bit basis (K=1).

Namely, under the USB the transfer data is encoded and transferred by a scheme called NRZI. The NRZI is an encode scheme intended to prevent out-of-synchronization by increasing the frequency of signal level change over the bus, on the notice that, in general data, "0"-bit occurrence ratio is by far higher than "1"-bit occurrence ratio. For this reason, the NRZI maintains the former signal level where the original data is "1" in bit, and inverts the former signal level where the original data is "0" in bit.

Consequently, If NRZI encode is made, where the original data has a "0"-bit row, the data after encode has a signal level changing every bit.

However, where the original data has a "1"-bit row, the state the data of after encode does not change in signal level continues a long time, resulting in the problem with out-of-synchronization.

For this reason, the USB carries out a process called bit stuffing on the original data upon transmission. Namely, if bit "1" continues successive 6 times, bit "0" is necessarily inserted following that. The data thus bit-stuffed is encoded by the foregoing NRZI. On the other hand, during reception, reception data is decoded by NRZI and thereafter subjected to bit unstuffing. By doing as the above, even where there is a "1"-bit row in the original data, the state the signal levels does not change is prevented from continuing for a long time.

In such bit unstuffing, bit stuffing, NRZI decode or NRZI encode, because the signal level in the current bit is determined in its state by seeing a state of signal level in preceding bit, it is usually premised to carry out a process on a 1-bit basis (serial data process). In the embodiment, the process premised on the 1-bit (K-bit) basis is carried out, for example, on an 8-bit (L-bit) basis.

Figure 2:
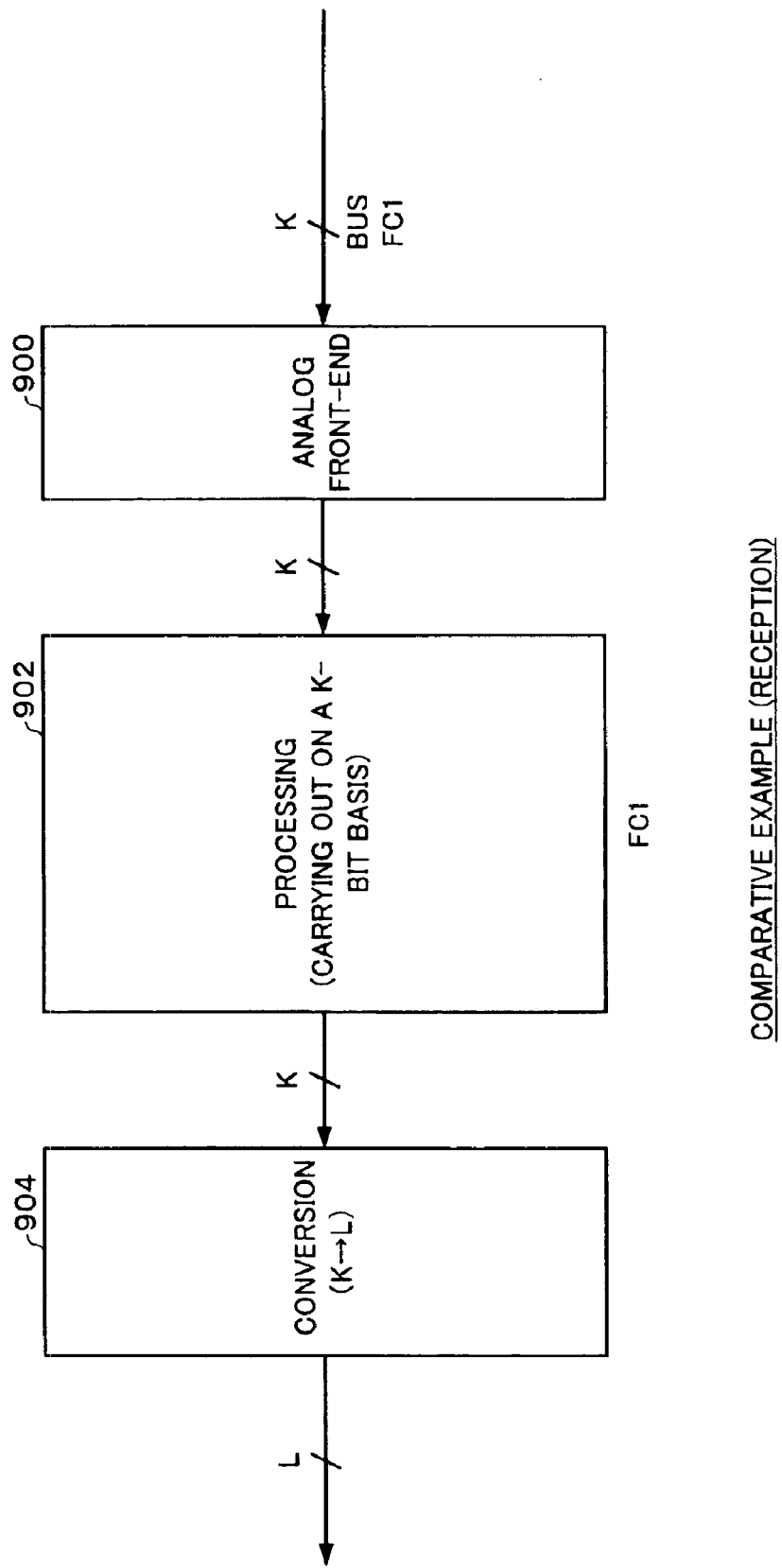
FIG. 2 is a diagram showing a configuration example of a comparative example.

FIG. 2 shows a configuration example of a comparative example to the embodiment.

The processing circuit 902 of FIG. 2 receives data having K-bit width from the analog front-end circuit 900, to carry out a process on a K-bit basis at a frequency FC1. For the USB as an example, the process of bit unstuffing and NRZI decode is made on 1-bit basis at a frequency of 480 MHz. A conversion circuit 904 rearranges and converts the K-bit-width data from the processing circuit 902 into data having an L-bit width and outputs the converted L-bit width data to a rear-staged circuit.

In the comparative example of FIG. 2, the processing circuit 902 must operate at a high frequency FC1 (e.g. 480 MHz).

In this case, a state-of-the-art semiconductor process for micro-fabrication, if adopted, makes it possible to realize a high-speed circuit operating at such a high frequency FC1.

However, where the data transfer control device (UTMI transceiver) is made in a macro cell for utilization in an ASIC (Application Specific Integrated Circuit), it is preferred to adopt a usual semiconductor process instead of the state-of-the-art semiconductor process in view of cost.

Meanwhile, if a circuit pattern of the processing circuit 902 or the like is manually laid out to optimize an interconnect capacitance, there is a high possibility to realize a high-speed circuit operating at the high frequency FC1 while using a usual semiconductor process.

However, such manual layout will incur the problems of design inefficiency, long development term, device-cost increase and the like.

Contrary to this, the embodiment, as shown in FIG. 1, allows the processing circuit 104 to carry out a process on a L-bit basis. Consequently, a K-bit-based process can be realized on a circuit operation, for example, at a frequency FC2=(K/L)×FC1. For the USB as an example, the processing of the processing circuit 104, for example, on an 8-bit basis (L=8) realizes the 1-bit (K=1) based bit-unstuffing and NRZI-decode processes on a circuit operation at a low frequency of FC2=(K/L)×FC1=(⅛)×480 MHz=60 MHz.

Accordingly, the embodiment makes it possible to properly realize K-bit-based bit-unstuffing and NRZI-decode processes without the use of a state-of-the-art semiconductor process for micro-fabrication, differently from the FIG. 2 comparative example requiring the operation of the processing circuit 902 at the high frequency FC1 (480 MHz).

In addition, because manual layout is unnecessary and a circuit pattern can be made with automatic layout interconnections such as gate arrays, development term can be reduced and device cost can be lowered.

Particularly, due to the recent data transfer realized over a bus on a differential signal with low amplitude (e.g. 400 mV), there is a tendency toward drastic increase in bus transfer rate. For example, the transfer rate of 12 Mbps under the USB1.1 has increased to 480 Mbps under the USB2.0. Also, under the IEEE1394, the maximum transfer rate over the bus is scheduled to increase from 400 Mbps to 3200 Mbps.

However, within the data transfer control device for transmitting and receiving data through a bus, it is impossible to decrease signal amplitude differently from the signal on the bus. Consequently, there is a limitation in increasing the circuit operation speed within the data transfer control device. There is a possibility that, even if the bus transfer rate is increased, the circuit operation within the data transfer control device cannot catch up with the speed increase.

In also this case, the embodiment can operate the processing circuit 104 of FIG. 1 at a low frequency, e.g. FC2=(K/L)×FC1. Accordingly, even where the standard is upgraded in version to gradually increase the bus transfer rate, the gradual lower setting of the ratio (K/L) makes it possible to suppress the frequency FC2 low and properly cope with the increased bus transfer rate.

In the meanwhile, the USB2.0 supports the FS (Full Speed) mode having been supported under the USB1.1. In the FS mode, data transfer is carried out at 12 Mbps by far lower than 480 MHz in the HS mode.

Figure 3:
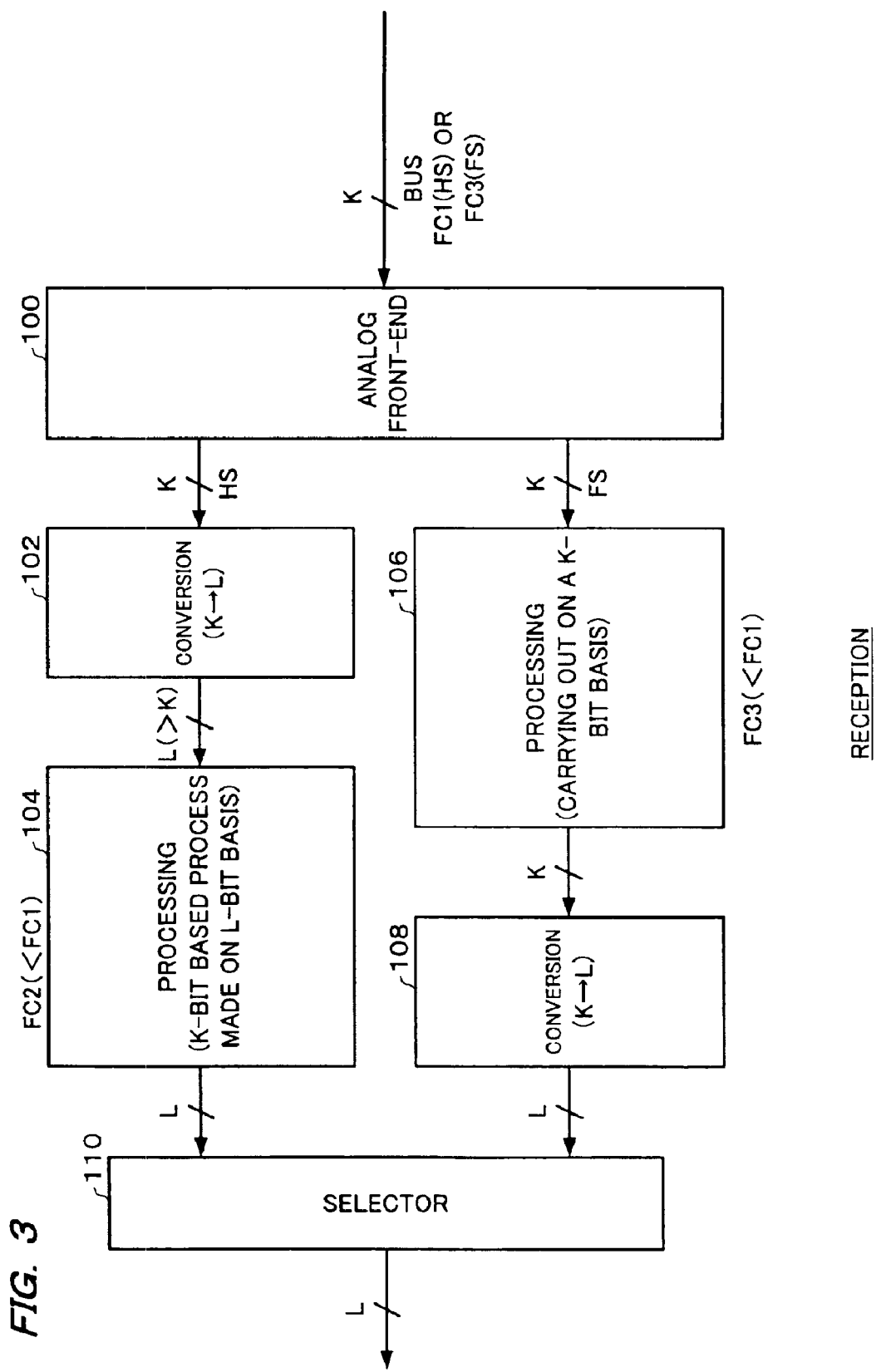
FIG. 3 is a diagram showing a configuration example at the reception end of the data transfer control device of the embodiment.

FIG. 3 shows a configuration example of a data transfer control device in the case the bus standard supports a plurality of transfer modes different in transfer rate as in the above.

FIG. 3 is different from FIG. 2 in that an FS-mode (broadly, second transfer mode) processing circuit 106 and conversion circuit 108 and a selector (selection circuit) 110 are provided besides the HS-mode (broadly, first transfer mode) conversion circuit 102 and processing circuit 104.

The conversion circuit 102 (first conversion circuit) rearranges and converts the K-bit-width data transferred in a high-speed HS mode (first transfer mode at frequency FC1) into data having an L-(L>K) bit width. Then, the processing circuit 104 (first processing circuit) receives the L-bit-width data from the conversion circuit 102 to carry out a K-bit-based process on an L-bit basis at the frequency FC2 (<FC1).

On the other hand, the processing circuit 106 (second processing circuit) processes the K-bit-width data transferred in a low-speed FS mode (second transfer mode at Frequency FC3) on a K-bit basis at a frequency FC3 (<FC1). Then, the conversion circuit 108 (second conversion circuit) rearranges and converts the K-bit-width data from the processing circuit 106 into data having an L-bit width.

The selector 110 selects any of the outputs of the processing circuit 104 and conversion circuit 108, and outputs selected L-bit-width data to a rear-staged circuit.

According to the configuration of FIG. 3, the data transferred in the high-speed HS mode is processed on an L-bit (8-bit) basis at a frequency FC2 (60 MHz) lower than the frequency FC1 (480 MHz) of the HS mode. Consequently, the process of bit unstuffing, NRZI decode or the like to be normally realized on the K-bit (1-bit) based circuit operation at high frequency (480 MHz) can be realized on a circuit operation at a low frequency (60 MHz).

On the other and, the data transferred in the low-speed FS mode is processed on the K-bit (1-bit) basis at the FS-mode frequency FC3 (12 MHz). Accordingly, the circuit (macro cell) designed for FS mode under the conventional USB1.1 can be utilized as it is, thus achieving shortened development term, simplified timing control and stabilized circuit operation.

Namely, the data transferred in the FS mode, even if processed on the K-bit (1-bit) basis as in the usual as shown in FIG. 3, will not cause such a problem as encountered in the HS mode because of the low operating frequency FC3 (12 MHz) in the processing circuit 106. The processing on the K-bit basis in this manner makes it possible to utilize as it is a circuit designed for the USB1.1 thus achieving shortened development term.

Figure 4:
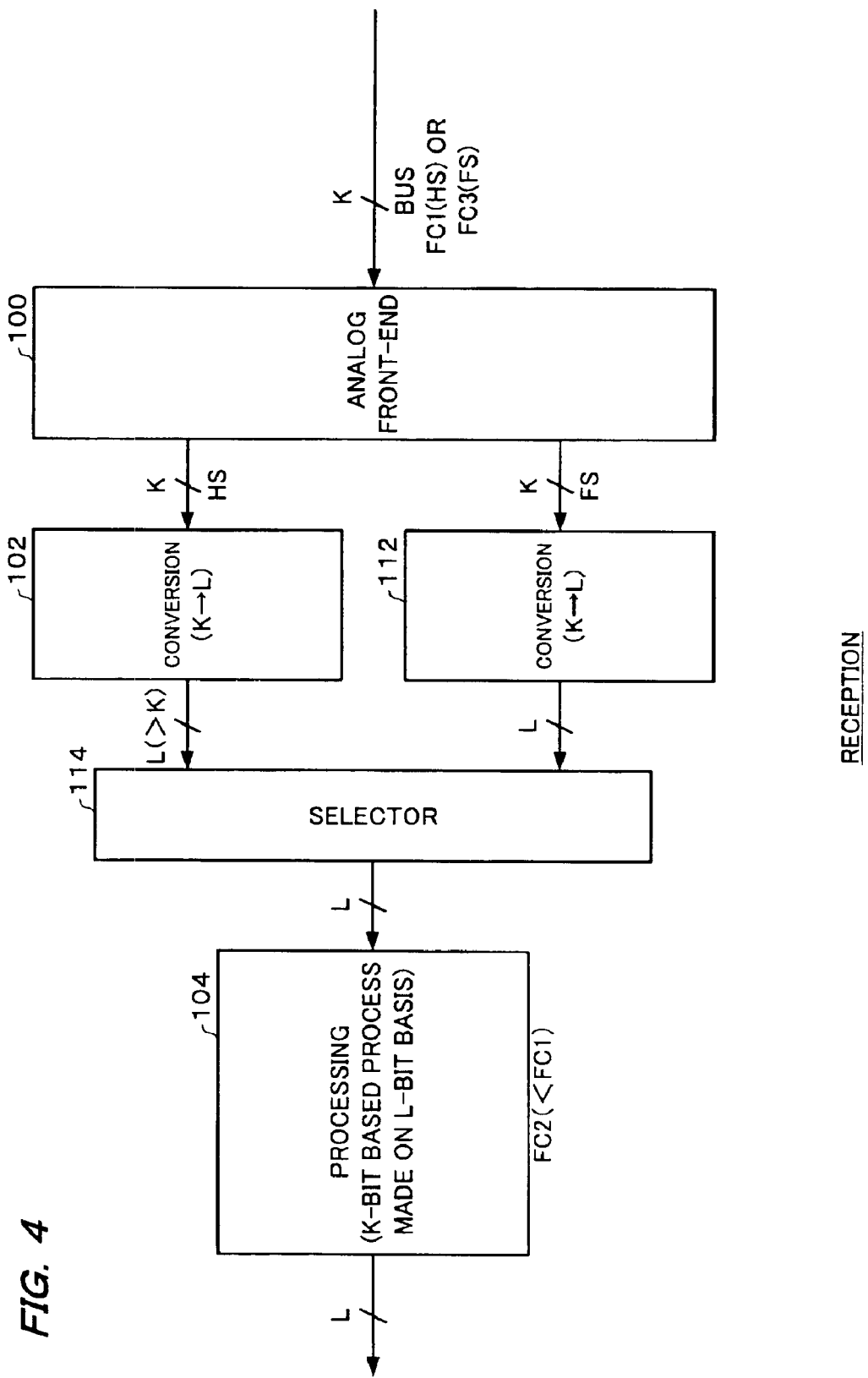
FIG. 4 is a diagram showing a configuration example at the reception end of the data transfer control device of the embodiment.

Note that the configuration as shown in FIG. 4 is desired where priority is placed upon scale reduction of a circuit rather than development-term shortening or timing-control easiness.

In FIG. 4, a conversion circuit 102 (first conversion circuit) rearranges and converts the K-bit-width data transferred in the high-speed HS mode (first transfer mode) into data having an L (L>K) bit width.

On the other hand, the conversion circuit 112 (second conversion circuit) rearranges and converts the K-bit-width data transferred in the low-speed FS mode (second transfer mode) into data having an L bit width.

A selector 114 (selection circuit) selects and outputs any of the outputs of the conversion circuits 102, 112. A processing circuit 104 receives the L-bit-width data from the selector 114 to carry out a K-bit-based process on the L-bit basis at a frequency FC2 (<FC1).

Note that, in FIG. 4, the conversion circuits 102, 112 may be made common in part of their circuits.

According to the configuration of FIG. 4, it is satisfactory to provide one processing circuit that was required two in FIG. 3. Consequently, there is a merit of reducing the circuit scale as compared to that of the FIG. 3 configuration.

However, the processing circuit 106 of FIG. 3 satisfactorily carries out the process on a K-bit (1-bit) basis differently from the processing circuit 104 for processing on the L-bit (8-bit) basis, and hence is small in its circuit scale. Accordingly, where the circuit scale of the processing circuit 106 is fully small as compared to the circuit scale of the data transfer control device overall, the configuration of FIG. 3 is preferred that is possible to shorten development term and simplify timing control.

In the meanwhile, in FIG. 1 the processing circuit 104 carries out, on the L-bit basis, the process normally to be made on the K-bit basis.

Figure 5:
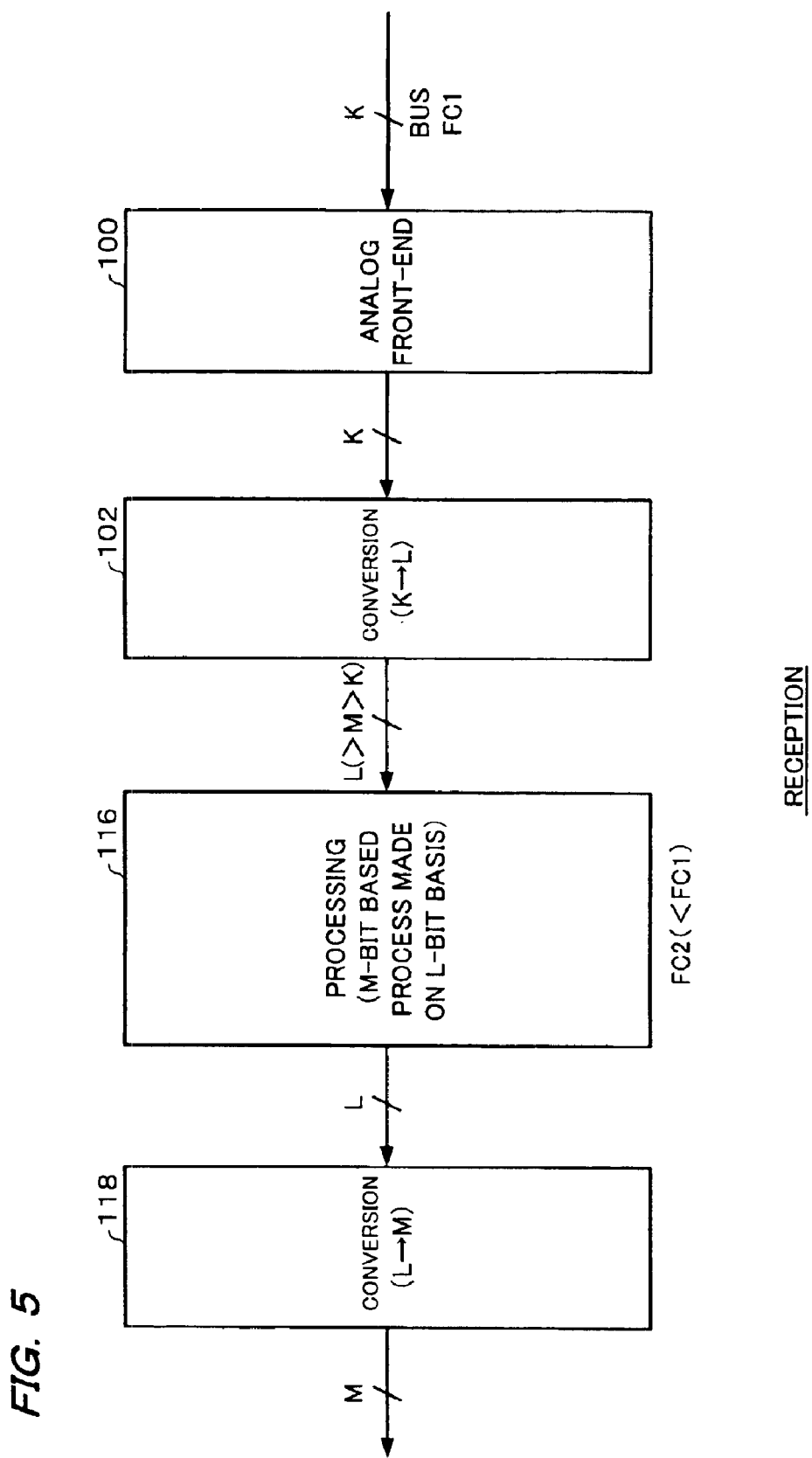
FIG. 5 is a diagram showing a configuration example at the reception end of the data transfer control device of the embodiment.

Contrary to this, in FIG. 5 a processing circuit 116 receives the data converted from the K-bit width into an L-bit width by a conversion circuit 102, to carry out, on an L-bit basis at a frequency FC2, the process normally to be made on an M (L>M>K) bit basis. Then, a conversion circuit 118 receives the L-bit width data from the processing circuit 116, and rearranges and converts the L-bit width data into data having an M-bit width.

Under the SCSI for example, the data transfer control device receives the 8-bit width (K-bit width) data through the bus. The data having a 16-bit width (M-bit width) is outputted from the data transfer control device to a rear-staged circuit (e.g. CPU).

In this case, the processing circuit 116 is premised to carry out a process normally on a 16-bit (M-bit) basis. In such a case, the processing circuit 116 of FIG. 5 carries out, e.g. on a 32-bit or 64-bit (L-bit) basis, such a process to be made on the 16-bit (M-bit) basis.

By doing so, even where the frequency FC1 of data transfer over the bus is increased in speed, because the processing circuit 116 satisfactorily operates at a frequency FC2 (e.g. (K/L)×FC1) lower than FC1, the process in the processing circuit 116 can be realized on a circuit operation at a low frequency.

1.2 Transmitting End Configuration

Figure 6:
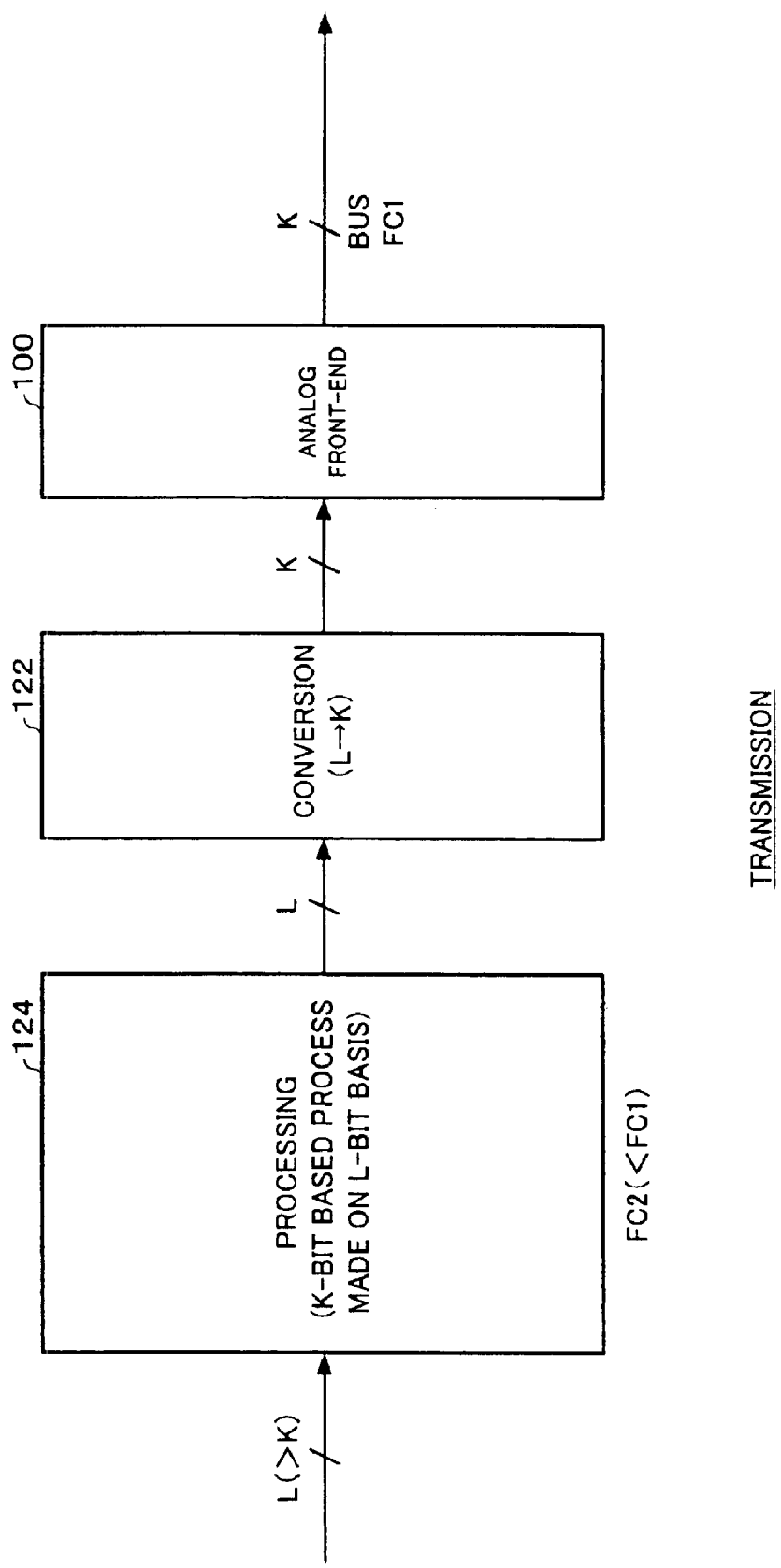
FIG. 6 is a diagram showing a configuration example at a transmission end of the data transfer control device of the embodiment.

FIG. 6 shows a transmitting-end configuration example of the data transfer control device according to the embodiment.

A processing circuit 124 receives, as an L (>K) bit width data, the data to be transferred on a K-bit basis through the bus, from a front-staged circuit, to carry out on an L-bit basis a process to be made on a K-bit basis. Also, a processing circuit 124 realizes such an L-bit-based process with a circuit operation at a frequency FC2 lower than the bus transfer frequency FC1.

Herein, the process to be made on the K-bit basis is a process as defined for execution on the K-bit basis or premised to be executed on the K-bit basis, for example, in the bus standard. For example, the bit stuffing or NRZI encode under the USB is usually premised to be executed on a 1-bit basis (serial data process) because the current-bit signal level state is determined by seeing the preceding-bit signal level state. In this embodiment, such a process as premised to be executed on a 1-bit (K-bit) basis is carried out, for example, on an 8-bit (L-bit) basis.

A conversion circuit 122 rearranges and converts the L-bit width data from the processing circuit 124 into data having a K-bit width. For example, where using a serial bus to transfer the 1-bit width data on a differential signal as under the USB or IEEE1394, the conversion circuit 122 would be a parallel-serial conversion circuit to convert 8-bit width parallel data into 1-bit width data (serial data).

An analog front-end circuit 100 is an analog circuit including a driver and receiver for data transfer. The analog front-end circuit 100 receives the K-bit width data from the conversion circuit 122, and transmits K-bit width data at a frequency FC1 by the use of a high-speed bus according to the USB, IEEE1394 or SCSI standard.

Figure 7:
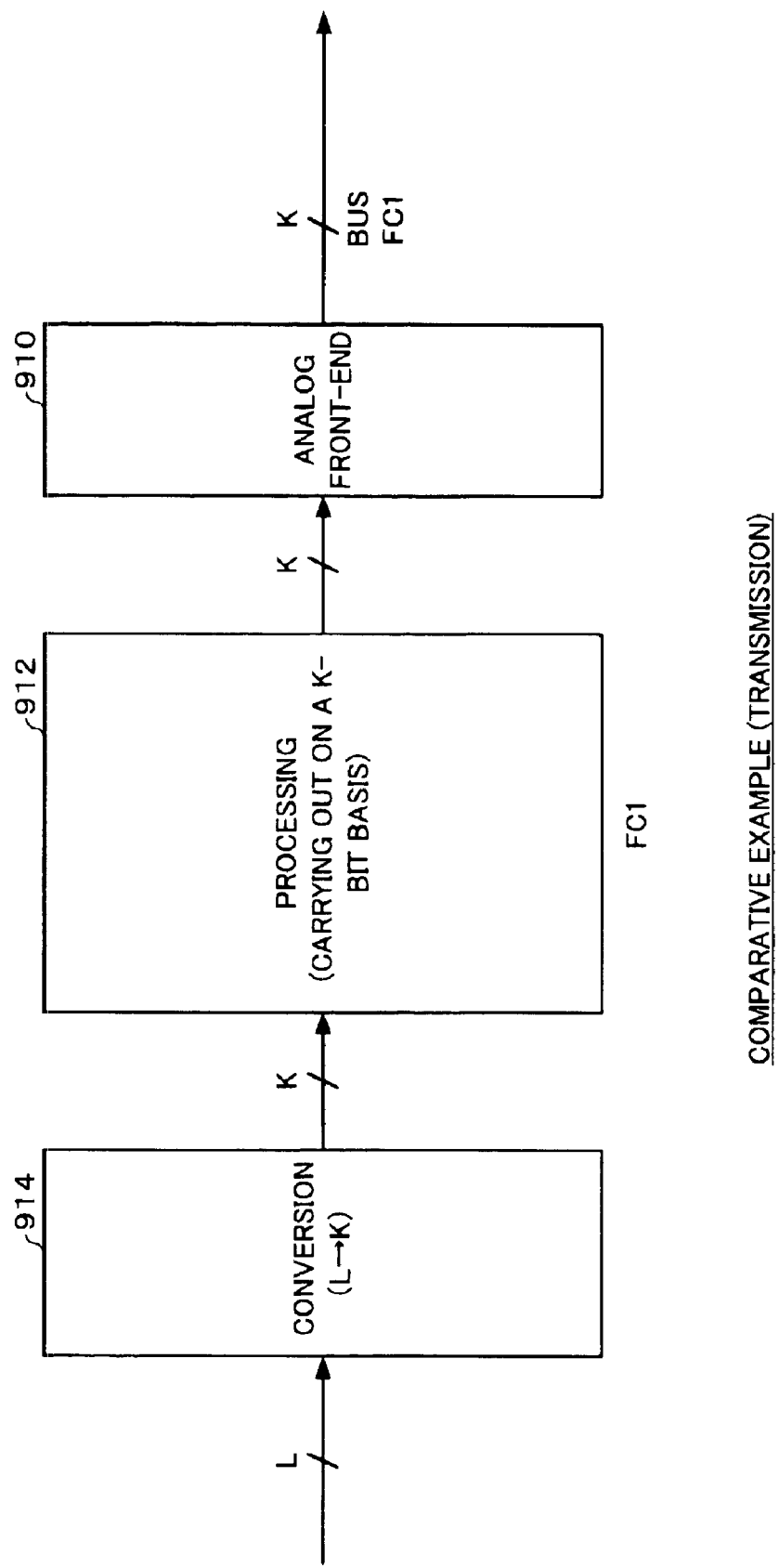
FIG. 7 is a diagram showing a configuration example of a comparative example.

FIG. 7 shows a configuration example of a comparative example to the embodiment.

In FIG. 7, a conversion circuit 914 rearranges and converts the L-bit width data from the front-staged circuit into data having a K-bit width. Then, a processing circuit 912 receives the K-bit width data from the conversion circuit 914 to carry out a process on a K-bit basis at a frequency FC1. Under the USB as an example, bit stuffing and NRZI encode processes are carried out on a 1-bit basis at a frequency of 480 MHz.

In the FIG. 7 comparative example, the processing circuit 912 must operate at a high frequency FC1 (e.g. 480 MHz). Accordingly, similarly to the explanation on the receiving-end comparative example of FIG. 2, there is a need for a state-of-the-art semiconductor process or manual layout, incurring the problems with increased manufacturing cost, design inefficiency, long development term and so on.

Contrary to this, in the embodiment, the processing circuit 124 carries out a process on an L-bit basis, as shown in FIG. 6. Accordingly, the process to be made on a K-bit basis can be realized on a circuit operation of a frequency FC2=(K/L)×FC1. Under the USB as an example, the process of bit stuffing and NZRI encode can be realized on a circuit operation at a low frequency of FC2=(K/L)×FC1=(⅛)×480 MHz=60 MHz.

Accordingly, according to the embodiment, similarly to the explanation on the reception end constitution example of FIG. 1, the K-bit based process such as of bit stuffing and NRZI encode can be properly realized without the use of a state-of-the-art semiconductor process.

Also, manual layout is not required thereby achieving shortened development time and reduced manufacturing cost.

Furthermore, even where the bus transfer rate is gradually increased due to version upgrade, the frequency FC2 can be suppressed low by gradually decreasing the setting of the ratio (K/L) thus properly coping with the increase of bus transfer rate.

Figure 8:
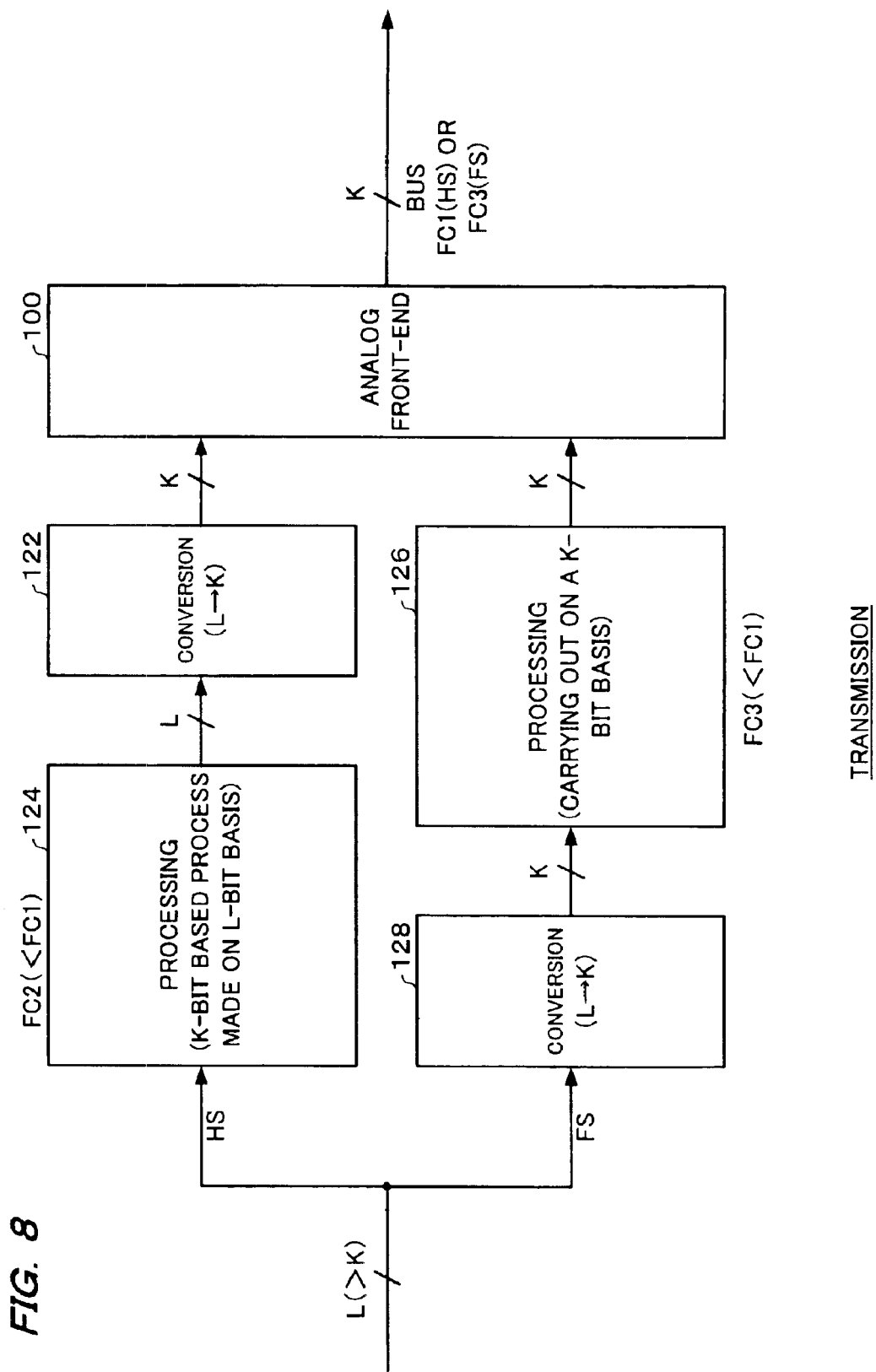
FIG. 8 is a diagram showing a configuration example at the transmission end of the data transfer control device of the embodiment.

Now, FIG. 8 shows a configuration example of the data transfer control device in the case where a plurality of transfer modes different in transfer rate are supported under the bus standard.

FIG. 8 is different from FIG. 6 in that a conversion circuit 128 and processing circuit 126 for an FS mode (second transfer mode) is provided besides the processing circuit 124 and conversion circuit 122 for the HS mode (first transfer mode).

A processing circuit 124 (first processing circuit) receives, from the front-staged circuit, the data to be transferred in an HS mode (first transfer mode at Frequency FC1) on a K-bit basis through the bus as an L-bit width data, to carry out on an L-bit basis at a frequency FC2 (<FC1) a process to be made on the K-bit basis. Then, a conversion circuit 122 (first conversion circuit) rearranges and converts L-bit width data from the processing circuit 124 into data having a K-bit width, and outputs the converted K-bit width data to an analog front-end circuit 100.

On the other hand, a conversion circuit 128 (second conversion circuit) receives, as L-bit width data from the front-staged circuit, the data to be transferred in an FS mode (second transfer mode at frequency FC3) through the bus on the K-bit basis, to rearrange and convert the L-bit width data into data having a K-bit width. Then, a processing circuit 126 (second processing circuit) processes, on the K-bit basis at a frequency FC3 (<FC1), the K-bit width data from a conversion circuit 128, and outputs the converted K-bit width data to the analog front-end circuit 100.

According to the configuration of FIG. 8, the data transferred in a high-speed HS mode is processed on the L-bit (8-bit) basis at the frequency FC2 (60 MHz) lower than the frequency FC1 (480 MHz) of the HS mode. Accordingly, the process of bit stuffing and NRZI encode to be normally realized by a circuit operation on the K-bit (1-bit) basis at a high frequency (480 MHz) can be realized on a circuit operation at a low frequency (60 MHz).

On the other hand, the data transferred in the low-speed FS mode is processed on the K-bit (1-bit) basis at the frequency FC3 (12 MHz) of the FS mode. Consequently, the circuit (macro cell) designed for the FS mode under the conventional USB1.1 can be utilized as it is, thus achieving shortened development term, timing control simplification and circuit operation stabilization.

Figure 9:
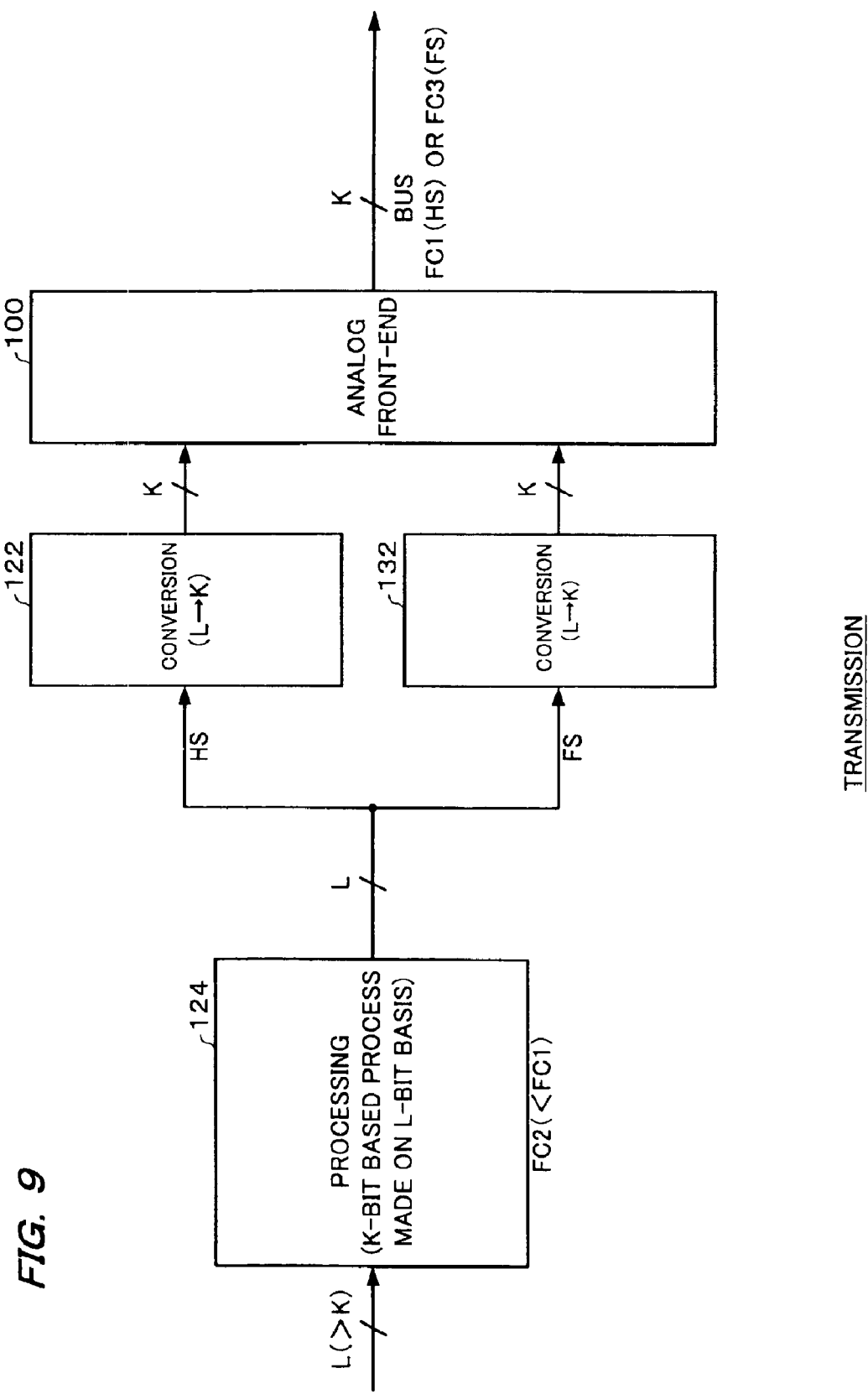
FIG. 9 is a diagram showing a configuration example at the transmission end of the data transfer control device of the embodiment.

Note that, where priority is placed on circuit-scale reduction rather than development term shortening and timing control easiness, the configuration as shown in FIG. 9 is desired.

In FIG. 9, a processing circuit 124 receives, as L (>K) bit width data, the data to be transferred on the K-bit basis in the HS or FS mode through the bus from the front-staged circuit, and carries out on an L-bit basis at a frequency FC2 (<FC1) the process to be made on the K-bit basis.

Then, a conversion circuit 122 (first conversion circuit) receives from a processing circuit 124 the L-bit width data to be transferred in an HS mode, and rearranges and converts the L-bit width data into data having a k-bit width to output it to an analog front-end circuit 100.

On the other hand, a conversion circuit 132 (second conversion circuit) receives from the processing circuit 124 L-bit width data to be transferred in the FS mode, and rearranges and converts the L-bit width data into data having a K-bit width to output it to the analog front-end circuit 100.

Note that, in FIG. 9, the conversion circuits 122, 132 in part may be made common.

According to the configuration of FIG. 9, the processing circuit required two in the number in FIG. 8 is satisfactorily reduced to one in the number. Accordingly, there is a merit that the circuit scale can be reduced as compared to the FIG. 8 configuration.

However, the processing circuit 126 of FIG. 8 is small in circuit scale because of satisfactorily carrying out a process on a K-bit (1-bit) basis differently from the processing circuit 124 for a process on an L-bit (8-bit) basis. Consequently, where the circuit scale of the processing circuit 126 is fully small as compared to the circuit scale of the data transfer control device overall, the configuration of FIG. 8 is more preferred that can achieve shortened development term and simplified timing control.

Now, in FIG. 6 the processing circuit 124 carries out, on an L-bit basis, the process to be normally made on the K-bit basis.

Figure 10:
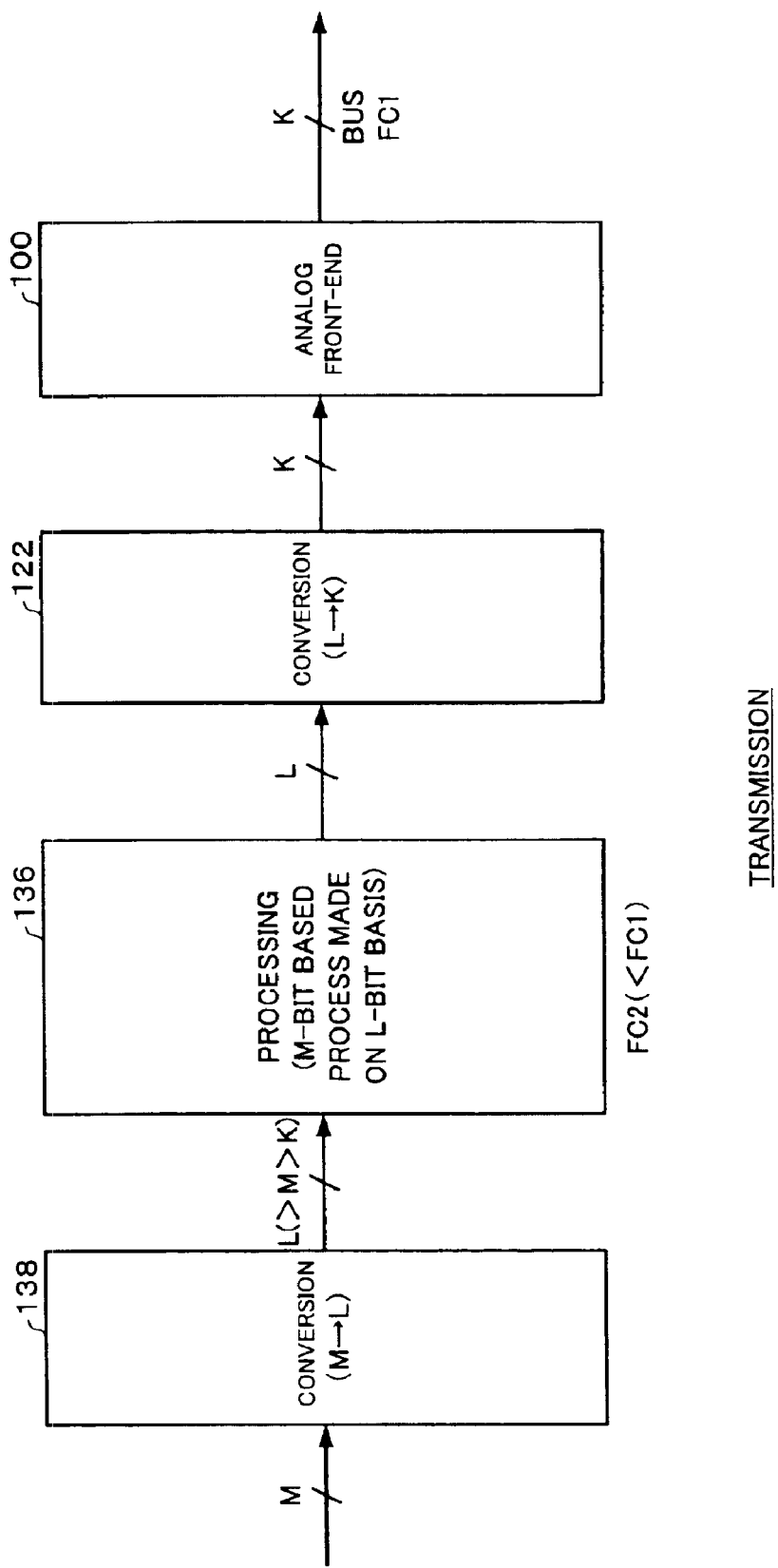
FIG. 10 is a diagram showing a configuration example at the transmission end of the data transfer control device of the embodiment.

Contrary to this, in FIG. 10 a processing circuit 136 receives the data converted from an M-bit width into an L-bit width by a conversion circuit 138, to carry out on an L-bit basis at a frequency FC2 a process to be normally made on the M-bit basis (L>M>K). A conversion circuit 122 receives the L-bit width data from the processing circuit 136, and rearranges and converts the L-bit width data into data having a K-bit width to be outputted to an analog front-end circuit 100.

Under the SCSI for example, 16-bit width (M-bit width) data is inputted from a front-staged circuit (e.g. CPU) to the data transfer control device. The data transfer control device transmits 8-bit width (K-bit width) data through the bus.

In this case, the processing circuit 136 is premised to normally carry out a process on a 16-bit (M-bit) basis. In such a case, the processing circuit 136 of FIG. 10 carries out, e.g. on a 32-bit or 64-bit basis, the process to be normally made on the 16-bit basis (M-bit).

This satisfactorily requires the processing circuit 136 to operate at a frequency FC2 (e.g. (K/L)×FC1) lower than FC1, even where a bus data transfer frequency FC1 is increased. Accordingly, it is possible to realize a process in the processing circuit 136 on a circuit operation at a lower frequency.

2. DETAILED DESCRIPTION 2.1 Overall Configuration of the Data Transfer Control Device FIG. 11 shows an example of the overall configuration of the data transfer control device of the embodiment.

Figure 11:
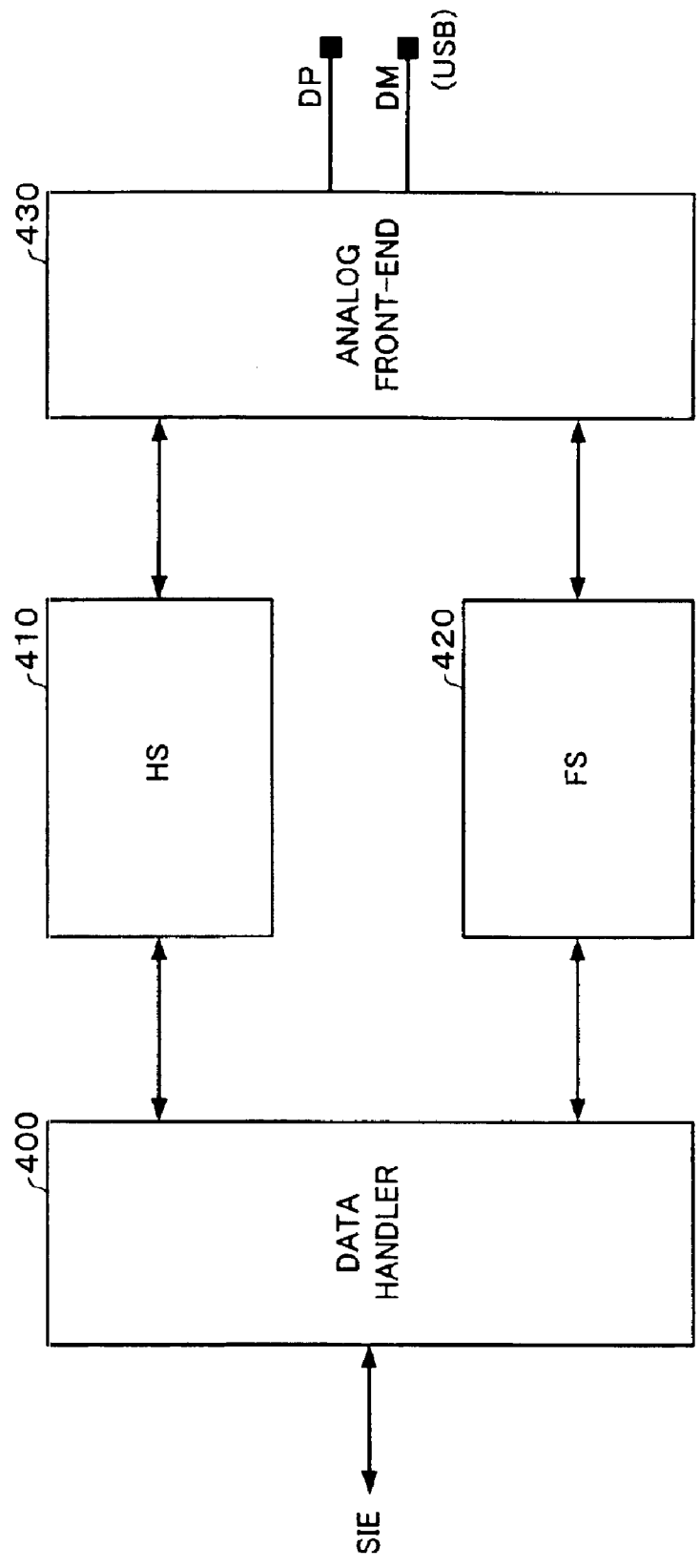
FIG. 11 is a diagram showing an example of the overall configuration of the data transfer control device of the embodiment.

The data transfer control device of FIG. 11 includes a data handler circuit 400, an HS (High Speed) circuit 410, an FS (Full Speed) circuit 420 and an analog front-end circuit 430. Note that the data transfer control device of the invention does not require all the circuit blocks shown in FIG. 11 but may be configured by omitting a part thereof.

The data handler circuit 400 (broadly, a given circuit for data transfer) carries out various processes for data transfer according to the USB or the like. More specifically, it during transmission carries out a process to add transmission data with SYNC (synchronization), SOP (Start Of Packet) and EOP (End Of Packet) and a process of bit stuffing. During reception, on the other hand, carried out are a process of detecting/deleting SYNC, SOP and EOP from reception data and a process of bit unstuffing. Furthermore, carried out also is a process to generate various timing signals for control of data transmission and reception.

Incidentally, reception data is outputted from the data handler circuit 400 to an SIE (Serial Interface Engine) as a rear-staged circuit while transmission data is inputted from the SIE to the data handler circuit 400.

The HS circuit 410 is a logic circuit for transmission and reception of data at (HS) high speed having a data transfer rate of as high as 480 Mbps. The FS circuit 420 is a logic circuit for transmission and reception of data at (FS) full speed having a data transfer rate of as high as 12 Mbps.

Herein, the HS mode is a transfer mode as newly defined under the USB2.0. On the other hand, the FS mode is a transfer mode as already defined under the USB1.1.

The USB2.0, already preparing such an HS mode, can realize not only data transfer in a printer, audio or camera but also data transfer in a storage such as a hard disk drive and optical disk drive (CDROM, DVD).

The analog front-end circuit 430 is an analog circuit including a driver or receiver for transmission and reception at FS or HS. Under the USB, data is transmitted and received on a differential signal using DP (Data+) and DM (Data−).

2.2 Bit Stuffing, NRZI

Figure 12:
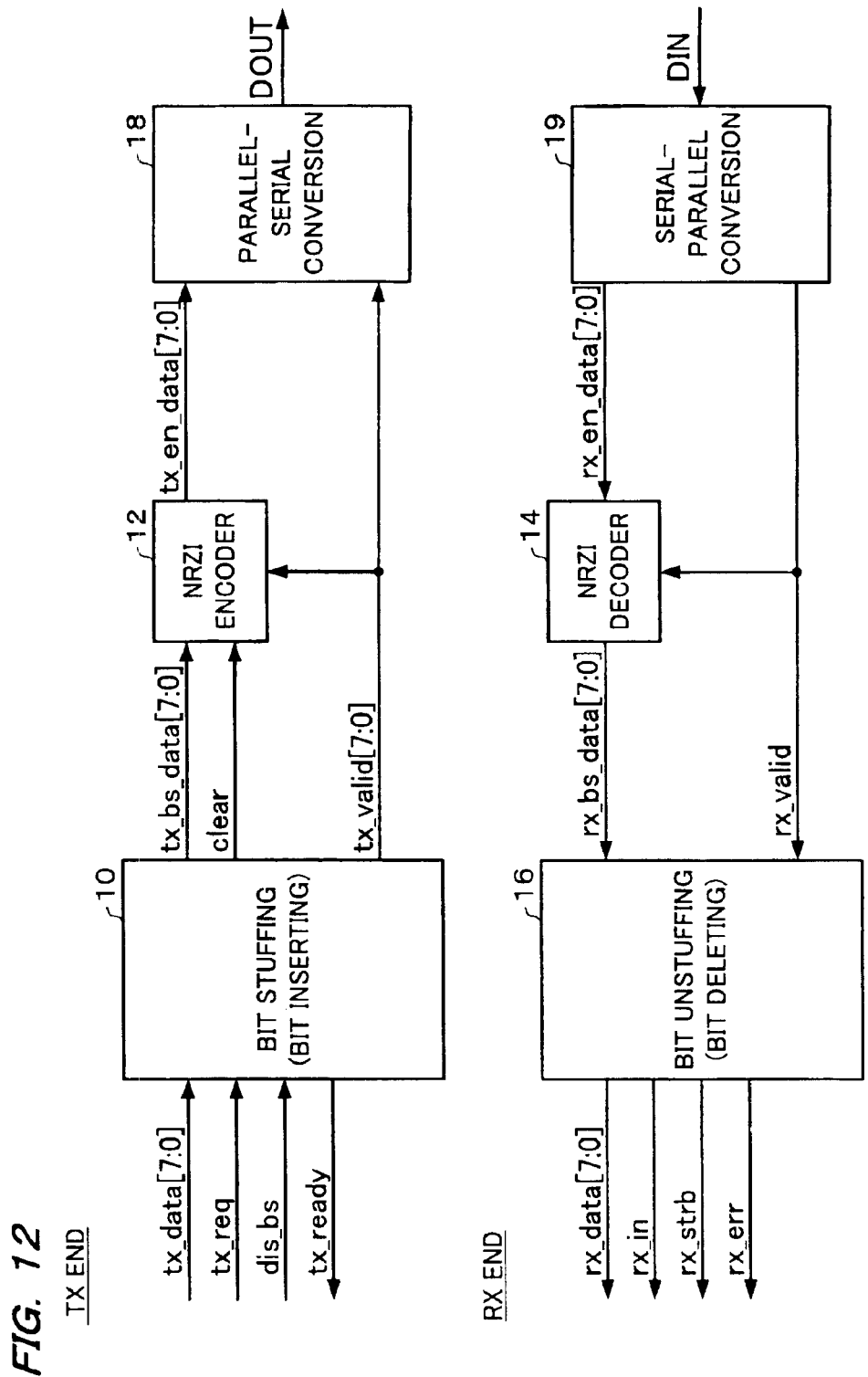
FIG. 12 is a diagram showing a configuration example of an essential part of the data transfer control device of the embodiment.

FIG. 12 shows a connection relational diagram between a bit stuffing circuit 10 (broadly, bit insertion circuit), an NRZI encoder 12 (broadly, encoder for converting parallel data into physical-layer parallel encoded data), an NRZI decoder 14 (broadly, decoder for decoding the parallel encoded data converted for physical layer to output parallel data), a bit unstuffing circuit 16 (broadly, bit deleting circuit), a parallel-serial conversion circuit 18 and a serial-parallel conversion circuit 19.

The bit stuffing circuit 10, NRZI encoder 12, NRZI decoder 14 and bit unstuffing circuit 16 of FIG. 12 are included, for example, in the data handler circuit 400 of FIG. 11. On the other hand, the parallel-serial conversion circuit 18 and serial-parallel conversion circuit 19 are included, for example, in the HS circuit 410 of FIG. 11.

The bit stuffing circuit 10 and NRZI encoder 12 are a circuit that operates during data transmission (TX) while the NRZI decoder 14 and bit unstuffing circuit 16 are a circuit that operates during data reception (RX).

First, NRZI (Non Return to Zero Invert) and bit stuffing will be briefly explained by using FIGS. 13A and 13B.

In NRZI, where the original data has bit "0" as shown at A1, A2 in FIG. 13A, signal level is inverted while where the original data has bit "1" as shown at A3, signal level is maintained. If adopting such an encode scheme, even where the original data has continuous bits of "0" and signal level is not changed for a long time, the data after NRZI is changed in signal level every bit. Consequently, where in the original data the bit occurrence rate of "0" is fully high as compared to the bit occurrence rate of "1", encode can be made to the optimal data for clock extraction.

However, as apparent from A3 of FIG. 13A, if the original data has continuous bits of "1", the state the data after NRZI does not change in signal level continues for a long time thus causing a problem with out-of-synchronization of PLL.

For this reason, the USB adopts a process called bit stuffing (broadly, bit insertion). Namely, as shown at A4 in FIG. 13B, if a bit "1" continues six times successively, a bit "0" is inserted without fail. As shown at A5, the data after bit stuffing is encoded with NRZI.

By doing so, even where bits "1" continue in the original data, the NRZI encoded data inverts in signal level as shown at A6 in FIG. 13B. Consequently, it is possible to solve the problem of continuing the state the signal level does not change for a long time. Thus, the optimal data can be obtained for clock extraction.

Note that, at the reception end, a bit unstuffing process is made to delete the bit "0" inserted by bit stuffing at the transmission end. Namely, where bits "1" continue six times successively followed by an inserted bit "0", the bit "0" is deleted.

Now, NRZI, bit stuffing and bit unstuffing are optimal for a serial data process, because the state of a signal level in the current bit is determined by seeing the state of a signal level in the preceding bit.

Figure 14:
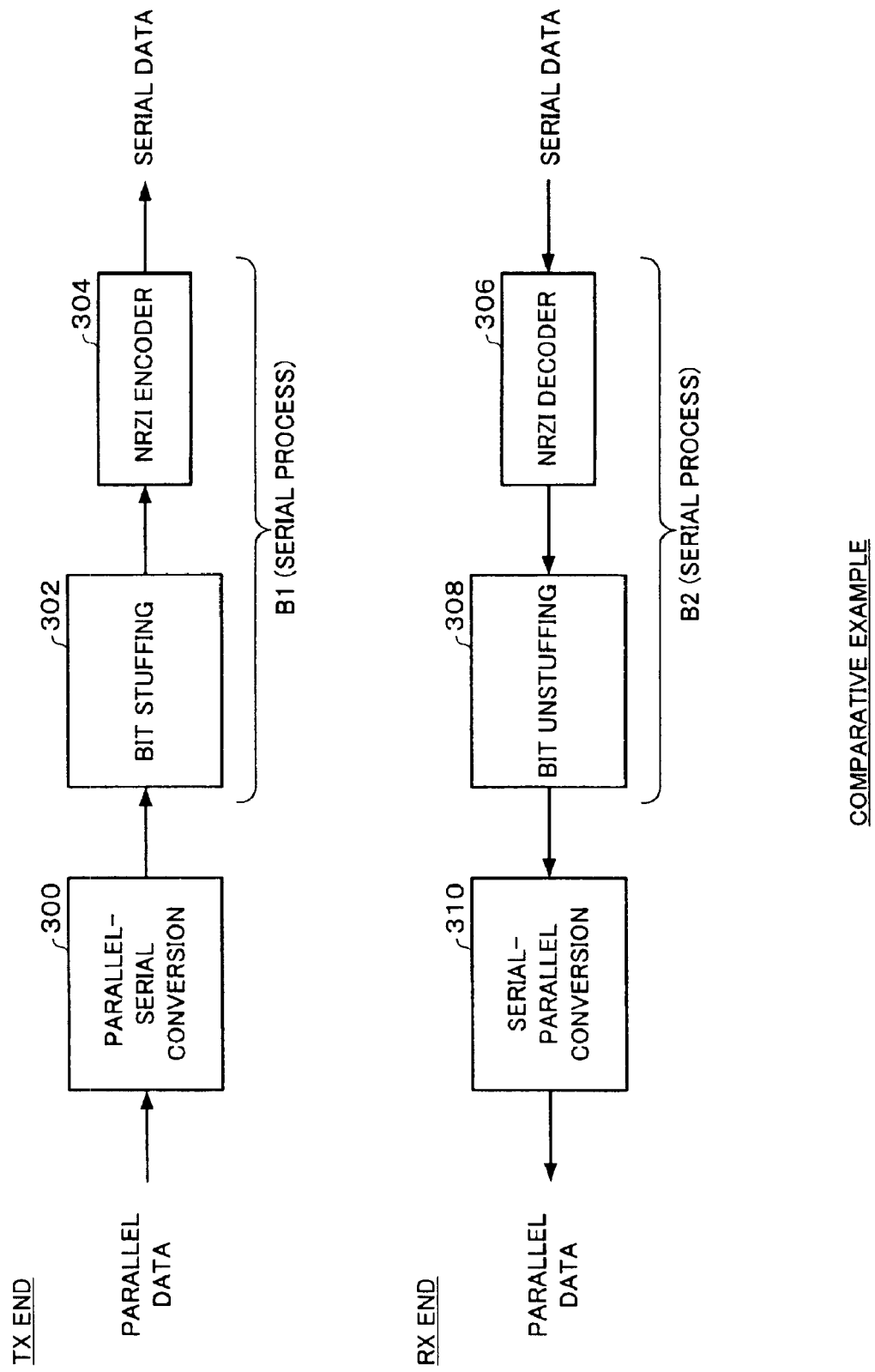
FIG. 14 is a diagram for explaining a comparative example.

Consequently, at the transmission end, as shown in the comparative example of FIG. 14 the bit stuffing circuit 302 or NRZI encoder 304 are usually provided at the rear stage of the parallel-serial conversion circuit 300. Bit stuffing or NRZI encode process is carried out on the serial data obtained by the conversion of the parallel-serial conversion circuit 300.

On the other hand, at the reception end, the NRZI decoder 306 or bit unstuffing circuit 308 is usually provided at the front stage of the serial-parallel conversion circuit 310. The process of bit unstuffing or NRZI decode is made in the serial data state to input processed serial data to the serial-parallel conversion circuit 310 thus obtaining parallel data.

However, in the HS mode under the USB2.0, data transfer rate is 480 Mbps. Consequently, the configuration of FIG. 14 must realize the serial data process (NRZI, bit stuffing, bit unstuffing) shown at B1, B2 at a clock frequency of 480 MHz.

In this case, the serial data process shown at B1, B2 can be realized at 480 MHz if a state-of-the-art semiconductor process for micro-fabrication is adopted.

However, for an ASIC or the like, the usual semiconductor process is desirably adopted instead of such a state-of-the-art semiconductor process in view of cost.

Meanwhile, if the circuit patterns, for example, of the bit stuffing circuit 302, the NRZI encoder 304, the NRZI decoder 306 and the bit unstuffing circuit 308 are manually laid out to have the optimal interconnect capacitance, the usual semiconductor process if used has the possibility to operate these circuit at 480 MHz.

However, such manual layout incurs the problems of prolonged IC development term and IC erroneous operation.

Accordingly, the embodiment at the transmission end provides a bit stuffing circuit 10 (bit inserting circuit) in the front stage of the parallel-serial conversion circuit 18, as shown in FIG. 12. The bit stuffing circuit 10 receives the 8-bit width (N-bit width) tx_data (parallel input data) inputted at a given clock cycle from the front-staged circuit, and outputs bit-stuffed (bit-inserted) 8-bit width tx_bs_data (parallel output data), for example, at the foregoing clock cycle.

Furthermore, an NRZI encoder 12, for converting the 8-bit width tx_bs_data from the bit stuffing circuit 10 into 8-bit width tx_en_data (parallel encoded data for a physical layer), is provided between the bit stuffing circuit 10 and the parallel-serial conversion circuit 18.

On the other hand, at the reception end, a bit unstuffing circuit 16 (bit deleting circuit) is provided in the rear stage of the serial-parallel conversion circuit 19. The bit unstuffing circuit 16 receives the 8-bit width (N-bit width) rx_bs_data (parallel input data) inputted at a given clock cycle through the serial-parallel conversion circuit 19, and outputs bit-unstuffed (bit-deleted) 8-bit width rx_data (parallel output data), for example, at the foregoing clock cycle.

Furthermore, an NRZI decoder 14, for decoding 8-bit width rx_en_data (parallel encoded data converted for a physical layer) to output it as 8-bit width rx_bs_data (parallel input data) to the bit unstuffing circuit 16, is provided between the serial-parallel conversion circuit 19 and the bit unstuffing circuit 16.

With the above configuration, the process of NRZI, bit stuffing and bit unstuffing can be realized still in a parallel-data state. Accordingly, in the case of N=8 bits for example, the bit stuffing circuit 10, NRZI encoder 12, NRZI decoder 14 and bit unstuffing circuit 16 satisfactorily operate at a low clock frequency of 480 MHz/8=60 MHz.

Accordingly, it is possible to realize the process of NRZI, bit stuffing and bit unstuffing without the use of a state-of-the-art semiconductor process for micro-fabrication. As a result, the data transfer control device can be cost-reduced.

Also, the circuits 10–16 do not require manual layout. Consequently, the patterns for the circuits 10–16 can be generated by an automatic layout interconnects such as a gate array, thus achieving shortened development term and cost-reduced data transfer control device.

Also, because the circuits 10–16 satisfactorily operate at a low clock frequency of 60 MHz, the resistance of data to skew and jitter can be enhanced thereby greatly enhancing the reliability of data transfer.

Figure 15:
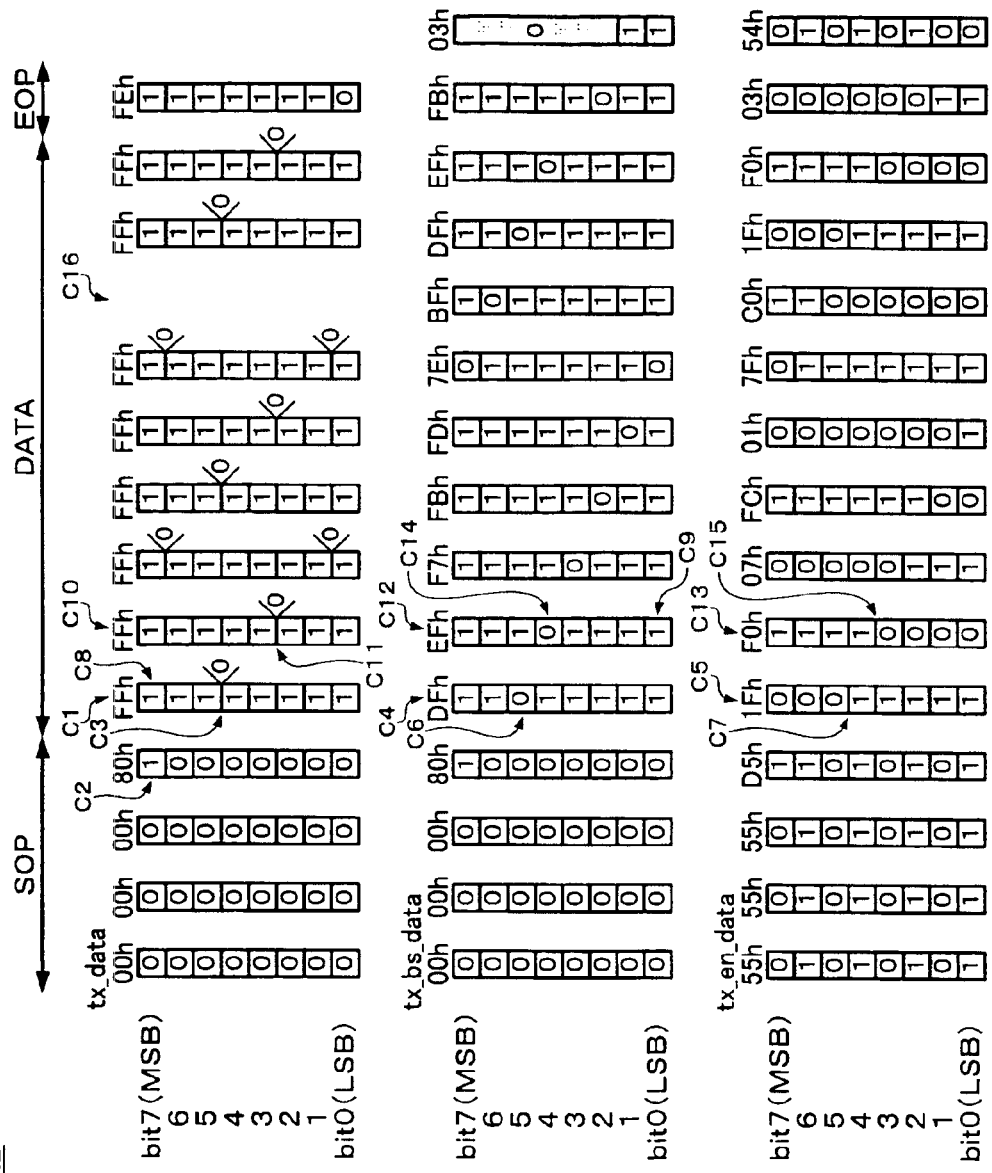
FIG. 15 is a diagram showing the manner of bit stuffing and NRZI encode at the transmission end.

FIG. 15 shows a manner of bit stuffing and NRZI encode at the transmission end.

Note that, under the USB, data is inputted and outputted LSB first. Also, under the USB2.0, no bit stuffing is carried out for EOP (FEh).

For simplifying explanation, showing is on the case that 3-byte (00000008h) added as SOP and 1-byte (FEh) added as EOP. Also, showing is made on the case that 8-byte (FFFFFFFFFFFFFFFFh) data is inputted as a packet proper although such data will not exist in the USB packet format.

Also, in FIG. 15, dot-screened parts signify that their values are not concerned.

For example, consider the case that, as shown at C1 in FIG. 15, (FFh) is inputted as tx_data to the bit stuffing circuit 10 of FIG. 12. In this case, because the continuation number to bit "1" at the last (on the MSB side) in the preceding cycle is 1 as shown by C2, bit "0" is inserted as shown at C3 by bit stuffing at a time that the continuation number to bit "1" becomes 5.

Consequently, the tx_bs_data to be outputted from the bit stuffing circuit 10 of FIG. 12 is (DFh) as shown at C4. The (DFh) is encoded to the NRZI encoder 12, to output (1Fh) as tx_en_data as shown at C5. Namely, as shown at C6, the tx_en_data is inverted in signal level as shown at C7 by inserting bit "0" due to bit stuffing as shown at C6. Accordingly, even where bit "1" successive, the tx_en_data is inverted in signal level to facilitate clock extraction at the reception end.

Note that, as shown at C3, the insertion of bit "0" results in bit overflow shown at C8. For this reason, the embodiment carries over the overflowed bit to the data in the next clock cycle as shown at C9.

Meanwhile, at C10 in FIG. 15, because the continuation number to bit "1" at the last in the preceding cycle is 2 (because bit of C8 is carried over), bit "0" is inserted as shown at C11 at a time that the continuation number to bit "1" becomes 4.

Accordingly, the tx_bs_data to be outputted from the bit stuffing circuit 10 is (EFh) as shown at C12. Also, the tx_en_data to be outputted from the NRZI encoder 12 is (F0h) as shown at C13. Namely, as shown at C14, the insertion of bit "0" inverts the signal level of tx_en_data as shown at C15, to facilitate the clock extraction at the reception side.

Also, at C16 in FIG. 15, because the cumulative value of the number of bit insertions (cumulative value in the number of overflow bits) becomes 8 or greater, the tx_data is stopped from being inputted from the front-staged circuit. This is realized by making inactive the signal tx_ready of FIG. 12 to be outputted to the front-staged circuit.

Figure 16:
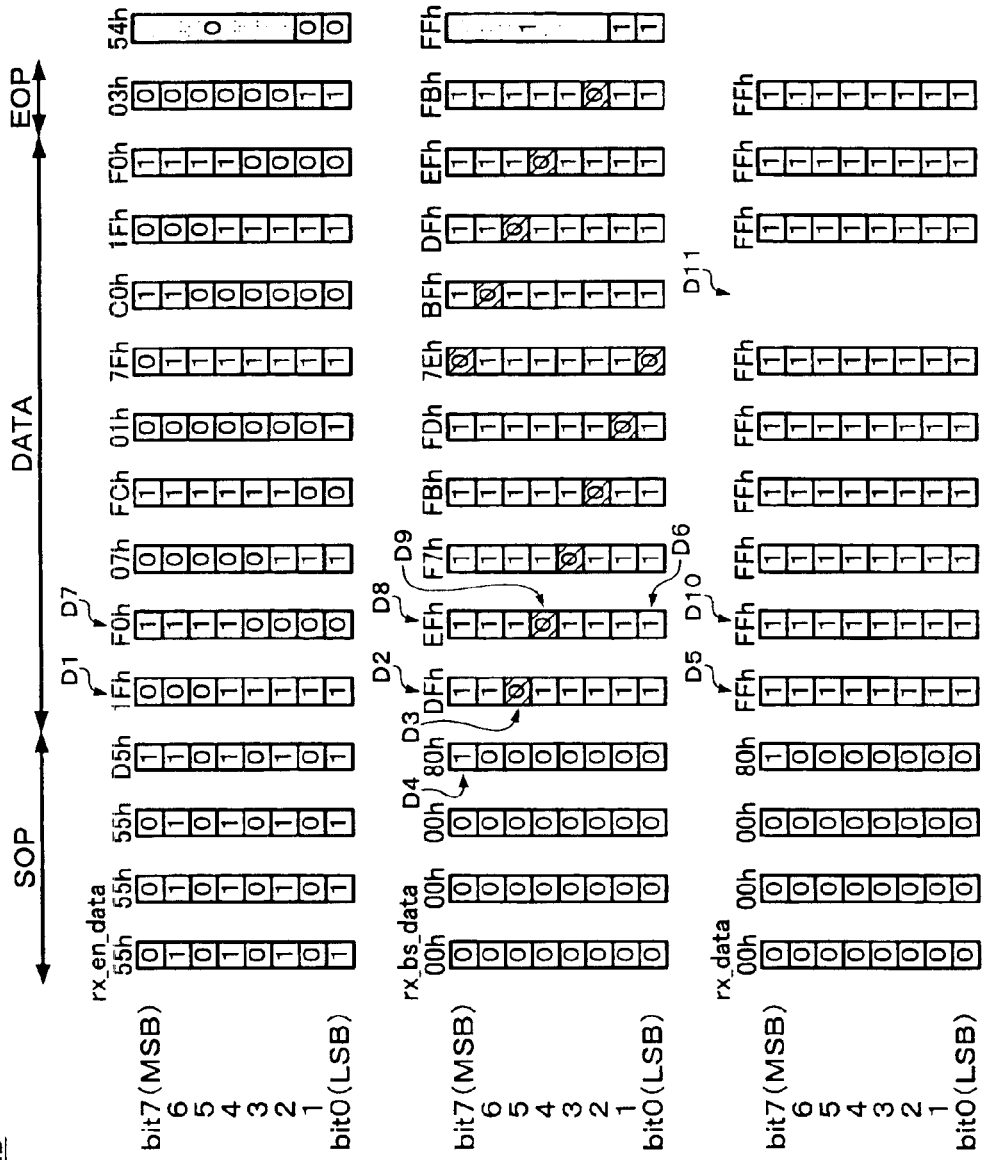
FIG. 16 is a diagram showing the manner of bit unstuffing and NRZI decode at the reception end.

FIG. 16 shows a manner of NRZI decode and bit unstuffing at the reception side.

FIG. 16 shows the case of inputting 8-byte (FFFFFFFFFFFFFFFFh) data as a packet proper similarly to FIG. 15 although such data does not exist in the USB packet format.

Also, in FIG. 16, dot-screened parts signify that their values are not concerned while hatched parts represent the bit inserted with "0" due to bit stuffing.

For example, where (1Fh) is inputted as rx_en_data to the NRZI decoder 14 of FIG. 12 as shown at D1 in FIG. 16, the rx_bs_data to be outputted from the NRZI decoder 14 is (DFh) as shown at D2. The (DFh) is the data having "0" inserted in a position shown at D3 due to bit stuffing at the transmission end (see C6 in FIG. 15).

If the (DFh) is inputted to the bit unstuffing circuit 16 of FIG. 12, the bit "0" shown at D3 is deleted. Namely, in this case, because the continuation number to bit "1" at the last in the preceding clock cycle is 1 as shown at D4, the next bit "0" is deleted due to bit unstuffing at a time that the continuation number to bit "1" becomes 5. Due to this, the rx_data to be outputted from the bit unstuffing circuit 16 is (FFh) as shown at D5.

Incidentally, if the bit "0" is deleted as shown at D3, the data length is shortened to less than 8. For this reason, the embodiment carries over the bit shown at D6 from the data in the next cycle.

Also, where (F0h) is inputted as rx_en_data to the NRZI decoder 14 as shown at D7 in FIG. 16, the rx_bs_data to be outputted from the NRZI decoder 14 is (EFh) as shown at D8. The (EFh) is the data having "0" inserted in the position shown at D9 due to bit stuffing at transmission end (see C14 in FIG. 15).

If the (EFh) is inputted to the bit unstuffing circuit 16, the bit "0" shown at D9 is deleted. Namely, in this case, because the continuation number to bit "1" at the last in the preceding cycle is 3 (because the bit shown at D6 is carried over), the next bit "0" is deleted at a time that the continuation number to bit "1" becomes 3. Due to this, the rx_data to be outputted from the bit unstuffing circuit 16 is (FFh) as shown at D10.

Meanwhile, at D11 in FIG. 16, because the cumulative value of the number of bit deletions (the cumulative value of the number of shortened bits) becomes 8 or greater, the rx_data taking process by the rear-staged circuit is suspended. This is realized by making inactive the signal rx_strb in FIG. 12 to be outputted to the rear-staged circuit.

2.3 Serial-Parallel Conversion circuit

Figure 17:
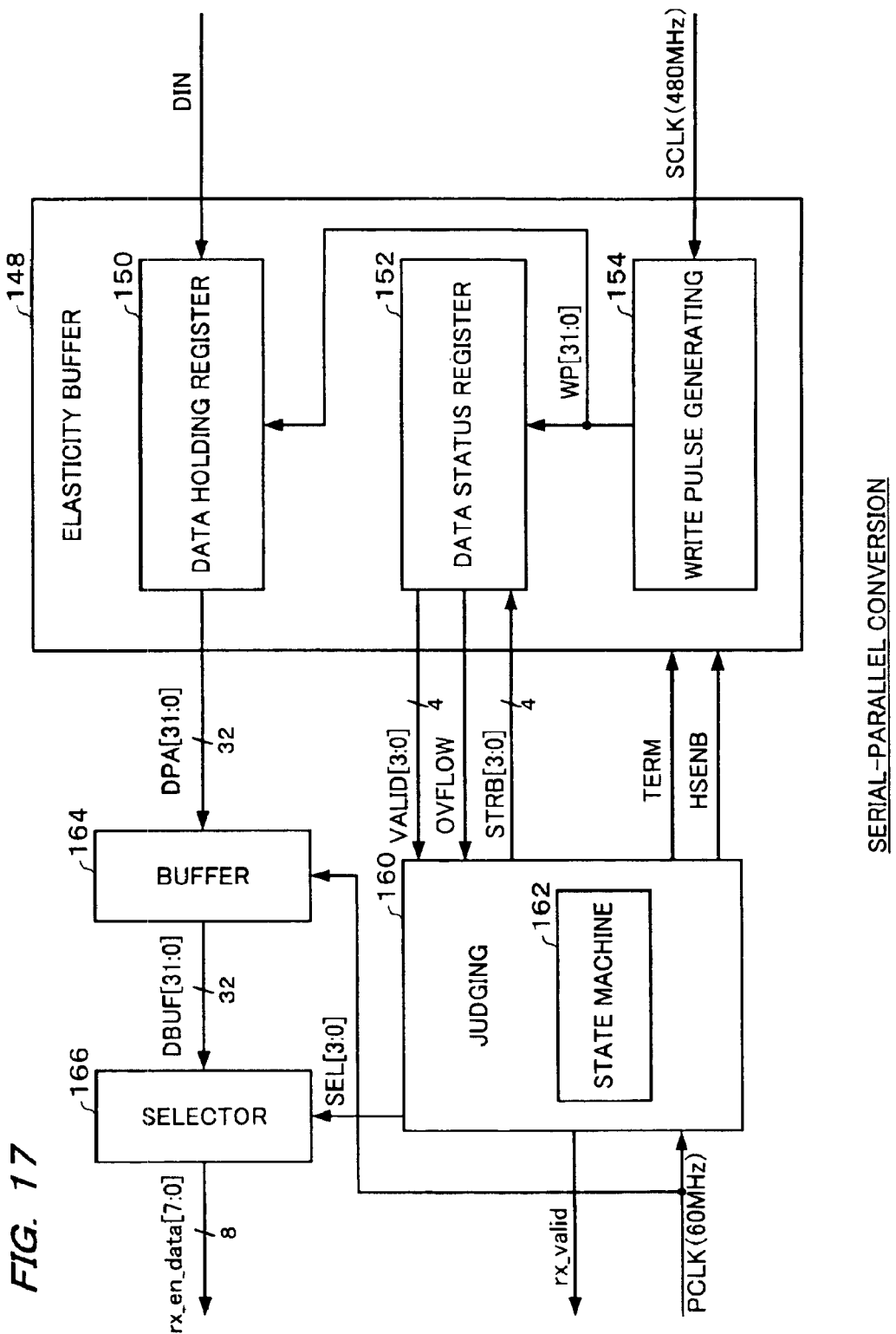
FIG. 17 is a diagram showing a configuration example of a serial-parallel conversion circuit.

FIG. 17 shows a detailed configuration example of the serial-parallel conversion circuit 19 of FIG. 12.

An elasticity buffer 148 is a circuit to absorb the difference of clock frequencies (clock drift) or the like between an internal device (data transfer control device) and an external device (external device connected to the bus), and includes a data holding register 150 (data holding means), a data status register 152 (data status hold means) and a write pulse generating circuit 154 (write pulse generating means).

Herein, the data holding register 150 is a register having a width of 32 bits to receive and hold serial data DIN.

The data status register 152 is a register having a width of 32 bits to hold a status of data of each bit of the data holding register 150.

The write pulse generating circuit 154 is a circuit to generate a 32-bit width write pulse signal WP and output it to the data holding register 150 and data status register 152.

Herein, the write pulse signal WP is a signal that the pulses thereof periodically assume active at an interval of 32 clock cycles of a sampling clock SCLK (broadly, at an interval of J clock cycles) wherein the pulses in the active period are deviated by one clock cycle from one another. The data holding register 150 holds the data of each bit depending on the write pulse signal WP. Similarly, the data status register 152 also holds the status of the data of each bit depending on the write pulse signal WP.

A judging circuit 160 (judging means) is a circuit to judge whether the data held in the data holding register 150 is valid or not on a data-cell basis constituted by a plurality of bits (e.g. 8 bits), which operates according to a state machine 162 built therein.

More specifically, the judging circuit 160 receives from the data status register 152 a 4-bit width signal VALID representing whether each data cell of the data holding register 150 is valid or not, and a signal OVERFLOW temporarily assuming active upon overflow of the data holding register 150.

Then, judgement is made whether each data cell is valid or not, to output a signal SEL for selecting valid data cell to a selector 166. Also, outputted to the data status register 152 is a signal STRB to clear the data status held in the data status register 152 on a data-cell basis. Furthermore, outputted to the elasticity buffer 148 is a signal TERM assuming active upon completing packet reception in the HS mode and signal HSENB to enable reception operation in the HS mode.

A buffer 164 receives 32-bit width parallel data DPA from the data holding register 150 and outputs the data DBUF synchronized with a 60-MHz clock PCLK and buffered to the selector 166.

The selector 166 (output means) selects the data of a valid data cell from the data DBUF from the buffer 164 depending on the signal SEL from the judging circuit 160, and outputs it as 8-bit width data rx_en_data to the NRZI decoder 14 of FIG. 12. Note that the signal rx_valid representing whether rx_en_data is valid or not is outputted from the judging circuit 160 to the bit unstuffing circuit 16 of FIG. 12.

Figure 18:
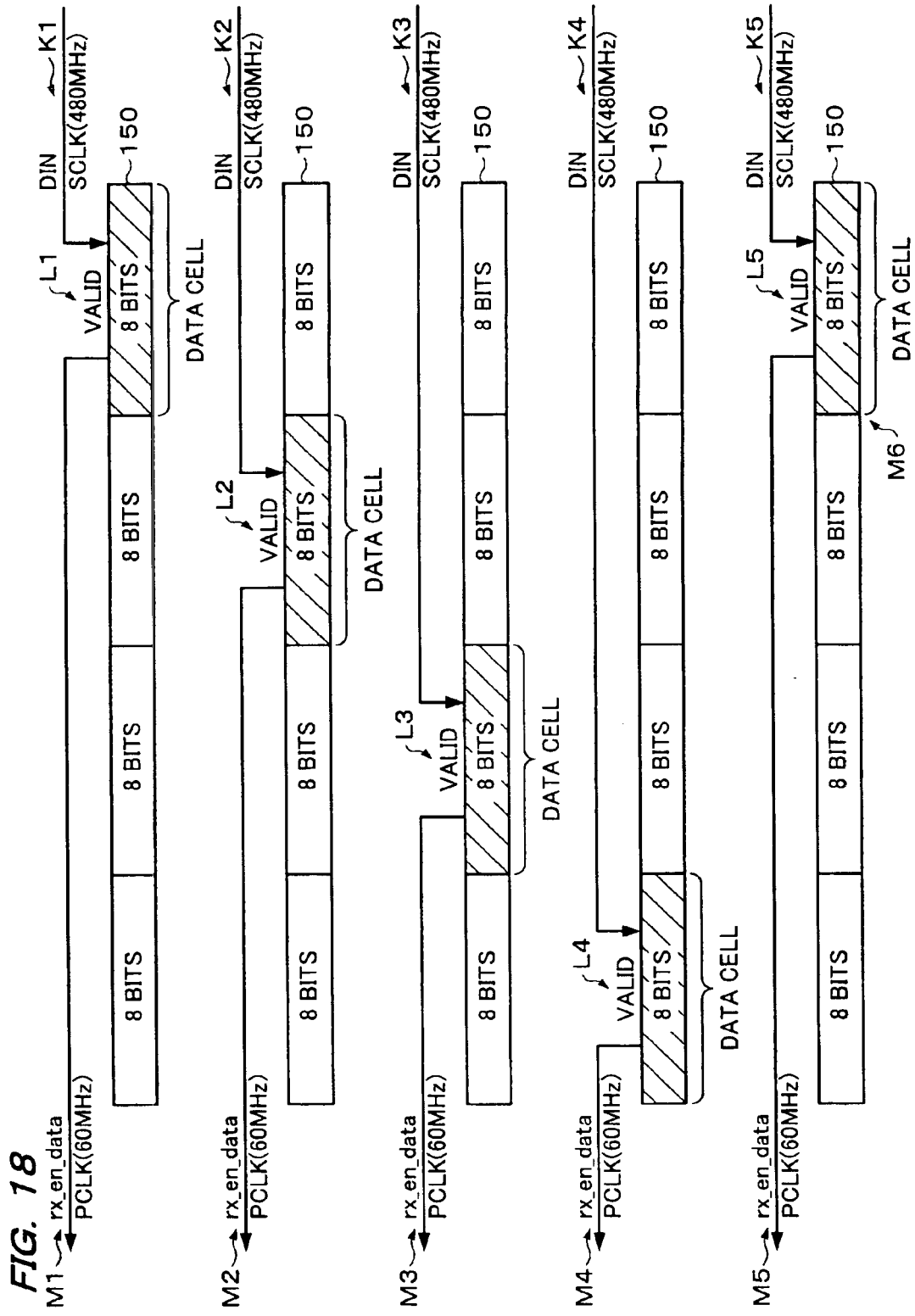
FIG. 18 is a diagram for explaining the operation of the serial-parallel conversion circuit.

FIG. 18 shows an operation concept of the serial-parallel conversion circuit 19 of FIG. 17.

In the serial-parallel conversion circuit 19 of FIG. 17, as shown at K1–K5 of FIG. 18 the serial data DIN to be inputted on a 480-MHz SCLK (first clock) is sequentially held to the data holding register 150.

Then, as shown at L1–L5 in FIG. 18, whether the data to be held in the data holding register 150 is valid or not (whether the data to be outputted has been gathered or not) is judged on the data-cell basis configured with 8 bits (broadly, plural bits). This is realized, for example, by the judgement by the judging circuit 160 of FIG. 17 depending on the signal VALID from the data status register 152.

Then, as shown at M1–M5 in FIG. 18, the data cell judged to be valid is outputted on the 60-MHz PCLK (second clock) lower in frequency than SCLK from the serial-parallel conversion circuit. This is realized for example by that the selector 166 in FIG. 17 selects the data of a valid data cell from the DBUF depending on the signal SEL from the judging circuit 160.

Note that as shown at M6 in FIG. 18 the data holding register 150 (elasticity buffer) of the embodiment is of a ring-buffer structure.

As shown in FIG. 18, according to the embodiment, whether data is valid or invalid is judged on a data-cell basis (plural bits basis), to output the data on a data-cell basis from the serial-parallel conversion circuit. Accordingly, it is possible to implement the judgement of data validness or invalidness, overflow error or the like depending, for example, on the low-frequency 60-MHz PCLK. Consequently, the elasticity buffer function as defined in the UTMI can be realized without the use of a state-of-the art semiconductor process for micro-fabrication.

Meanwhile, because the judging circuit 160 and the like are satisfactorily operated at a low-speed clock frequency, the resistance to clock skew and jitter can be enhanced thereby greatly improving the reliability of data transfer.

2.4 Bit Stuffing Circuit

Figure 19:
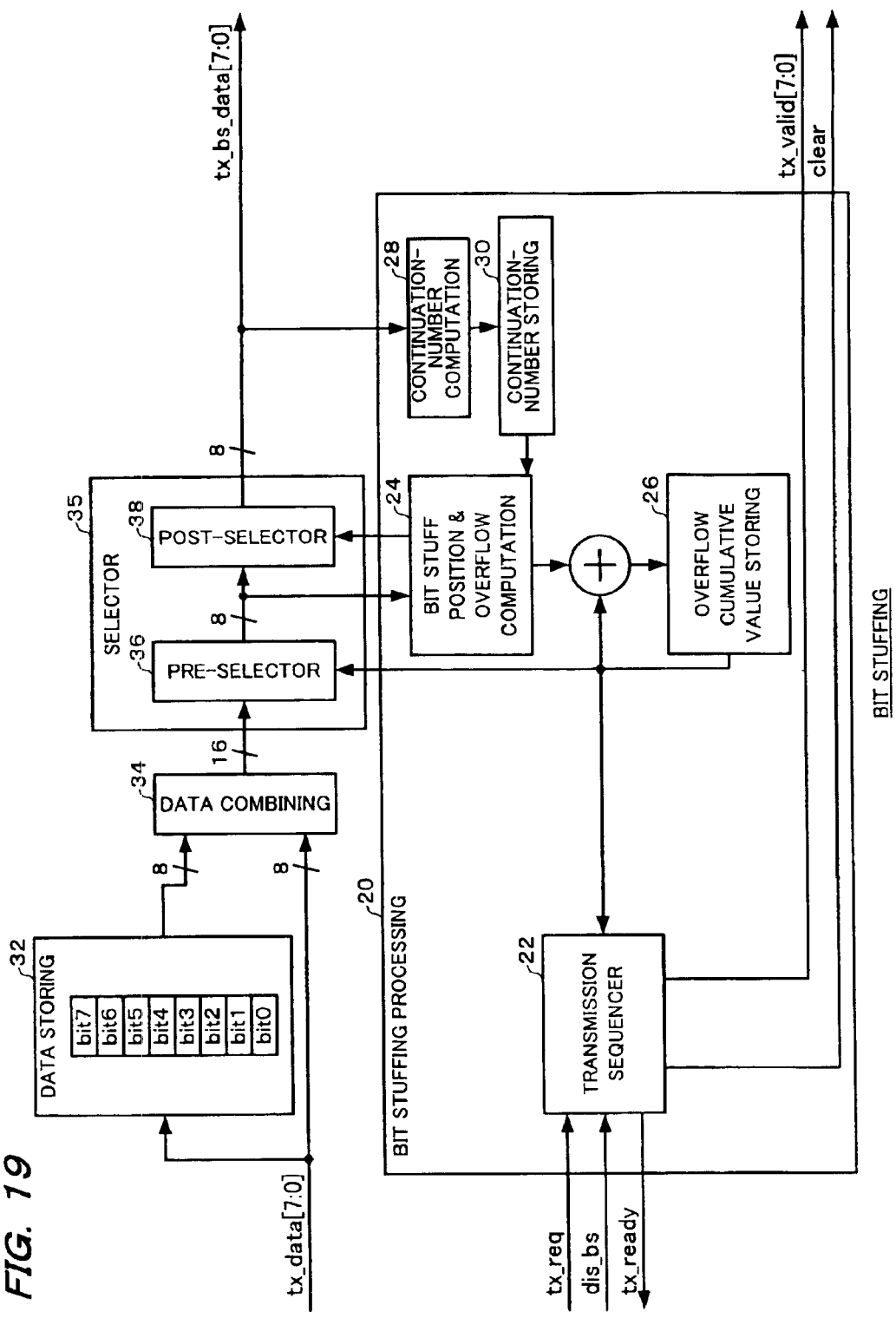
FIG. 19 is a diagram showing a configuration example of a bit stuffing circuit (bit inserting circuit)

FIG. 19 shows a configuration example of the bit stuffing circuit of FIG. 12.

The bit stuffing circuit 10 includes a bit stuffing processing circuit 20, a data storing circuit 32, a data combining circuit 34 and a selector 35 having a pre-selector 36 (pre-shifter) and post-selector 38 (post-shifter).

Herein, the bit stuffing processing circuit 20 is to carry out a process to carry over the overflowed bits due to bit insertion to the data in the next clock cycle, and includes a transmission sequencer 22, a bit stuffing position & overflow computation circuit 24, an overflow cumulative value storing circuit 26, a continuous-number computation circuit 28 and a continuous-number storing circuit 30.

The transmission sequencer 22 generates various signals for bit stuffing and transmission processes, specifically, the control signals to the circuit blocks in the bit stuffing processing circuit 20. This also receives a transmission request signal tx_req and a bit stuffing prohibit instruction signal dis_bs from the front-staged circuit, and outputs a transmission ready signal tx_ready. This also outputs a signal tx_valid representing whether the tx_bs_data is valid or not and a clear signal clear to the rear-staged NRZI encoder (at 12 in FIG. 12).

The bit stuffing position & overflow computation circuit 24 carries out a process to operate a bit stuffing position (second signal level bit inserting position) and the number of bits overflowed due to bit stuffing (bit insertion).

The overflow cumulative value storing circuit 26 stores an overflow cumulative value obtained due to cumulatively adding (or satisfactorily subtracting) overflowed bits operated by the bit stuffing position & overflow computation circuit 24.

In the embodiment, bit "0" for bit stuffing is inserted depending on an operated bit-stuffing position. Also, the range of tx_bs_data to be outputted is determined depending on the stored overflow cumulative value.

The continuation-number computation circuit 28 operates a continuation number of the bit "1" at the last of the tx_bs_data. The continuation number is stored in a continuation-number storing circuit 30.

The bit stuffing position & overflow computation circuit 24 will operate a bit stuffing position depending on a continuation number to the last "1" stored in the last-time clock cycle by the continuation number storing circuit 30.

The data storing circuit 32 is a circuit to store all the bits of tx_data precedent by 1 clock cycle. Note that, if required, stored may be part of or all the bits of the tx_data precedent by 2 clock cycles or part of or all the bits of the tx_data precedent by 3–M (M>4) clock cycles.

The data combining circuit 34 combines together all the bits of the tx_data precedent by 1 clock cycle stored in the data storing circuit 32 and all the bits of the tx_data in the current clock cycle, to output a 16-bit width combined data.

The pre-selector 36 selects 8-bit width data from the 16-bit width combined data depending on overflow cumulative value from the overflow cumulative value storing circuit 26, and outputs it to the post-selector 38.

The post-selector 38 receives the 8-bit width data from the pre-selector 36, inserts bit "0" to the bit stuffing position operated by the bit stuffing position & overflow computation circuit 24, and outputs the bit-inserted 8-bit width tx_bs_data.

Next, the circuit operation of FIG. 19 will be explained in detail using FIG. 20.

Figure 20:
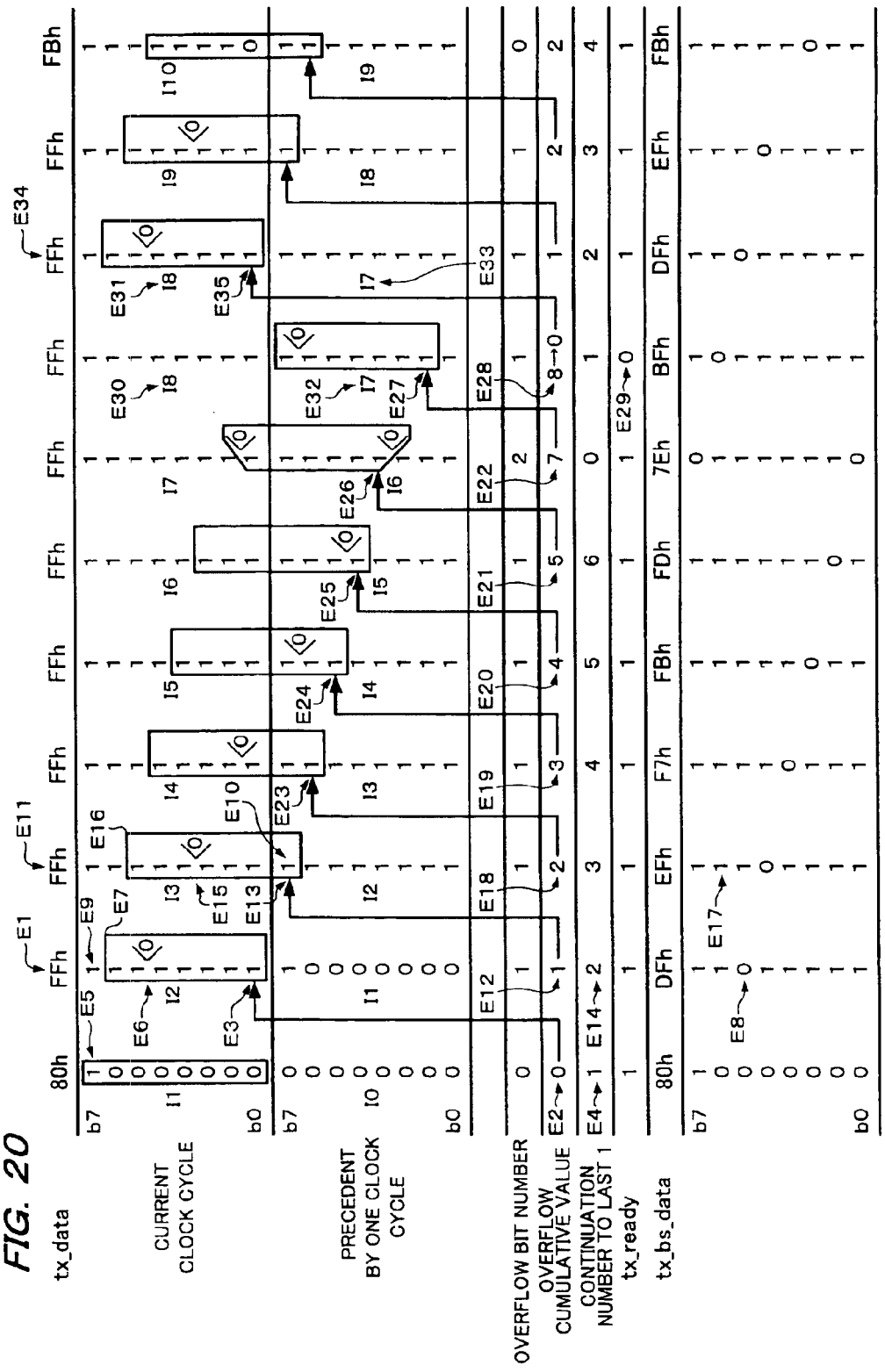
FIG. 20 is a diagram for explaining the operation of the bit stuffing circuit.

For example, at E1 in FIG. 20, the data combining circuit 34 is inputted by I2=(FFh) as the tx_data in the current clock cycle and I1=(80h) as the tx_data precedent by 1 clock cycle stored in the data storing circuit 32. The data combining circuit 34 outputs combined data comprising (FFh) and (80h) to the pre-selector 36.

At this time, the overflow cumulative value to be stored in the overflow cumulative value storing circuit 26 is 0 as shown at E2 in FIG. 20. Accordingly, the pre-selector 36 receiving the overflow cumulative value from the overflow cumulative value storing circuit 26 selects and outputs, from the combined data, 8-bit width data having a top bit in the position shown at E3.

Meanwhile, because the continuation number to "1" at the last of the storage in the continuation-number storing circuit 30 is 1 as shown at E4, E5 in FIG. 20, the bit stuffing position & overflow computation circuit 24 performs a calculation 6–1=5, to notify the position shown at E6 as a bit stuffing position to the post-selector 38.

Thereupon, the post-selector 38, receiving the 8-bit width data from the pre-selector 36 and the bit stuffing position from the bit stuffing position & overflow computation circuit 24, inserts bit "0" to a designated bit stuffing position. Due to this, the 8-bit width data (DFh) shown at E7 is outputted as tx_bs_data, as shown at E8.

Incidentally, in this case, because the bit shown at E9 of the 8-bit width data outputted from the pre-selector 36 becomes an overflow bit due to bit stuffing, it is carried over to the data in the next clock cycle as shown at E10.

At E11 in FIG. 20, the data combining circuit 34 combines and outputs I3=(FFh) and I12=(FFh) to the pre-selector 36.

At this time, the overflow cumulative value is added by one into 1, as shown at E12 in FIG. 20. Consequently, the pre-selector 36 selects and outputs 8-bit width data having a top bit in a position shown at E13 from the combined data.

Also, because the continuation number to "1" at the last is 2 as shown at E14, the position shown at E15 is notified as a bit stuffing position to the post-selector 38.

Thereupon, the post-selector 38 inserts bit "0" to a designated bit stuffing position. This outputs (EFh) shown at E16 as tx_bs_data, as shown at E17.

As in the above, the bit-stuffed tx_bs_data is sequentially outputted in every clock cycle. Each time bit "0" is inserted due to bit stuffing, the overflow cumulative value increases as shown at E18, E19, E20, E21 and E22. Due to this, the position of taking 8-bit width data changes as shown at E23, E24, E25, E26 and E27.

When the overflow cumulative value reaches 8 as shown at E28, the overflow cumulative value is initialized to 0 (for 9, initialization is to 1). Thereupon, the transmission sequencer 22 of FIG. 19 makes the transmission ready signal tx_ready to be outputted to the front-staged circuit inactive only for one clock cycle, as shown at E29 in FIG. 20. Due to this, as shown at E30 and E31, the input of tx_data is stopped for only one clock cycle period. Also, as shown at E32 and E33, the data taking to the data storing circuit 32 of FIG. 19 is also suspended.

In the next E34 clock cycle, the overflow cumulative value is initialized to 0 so that 8-bit width data is taken out of the position shown at E35.

By the above, the embodiment succeeds to take out 8-bit width data from the combined data without contradiction even where the overflow cumulative value becomes 8 or 9 (predetermined value).

2.5 NRZI Encoder

Figure 21:
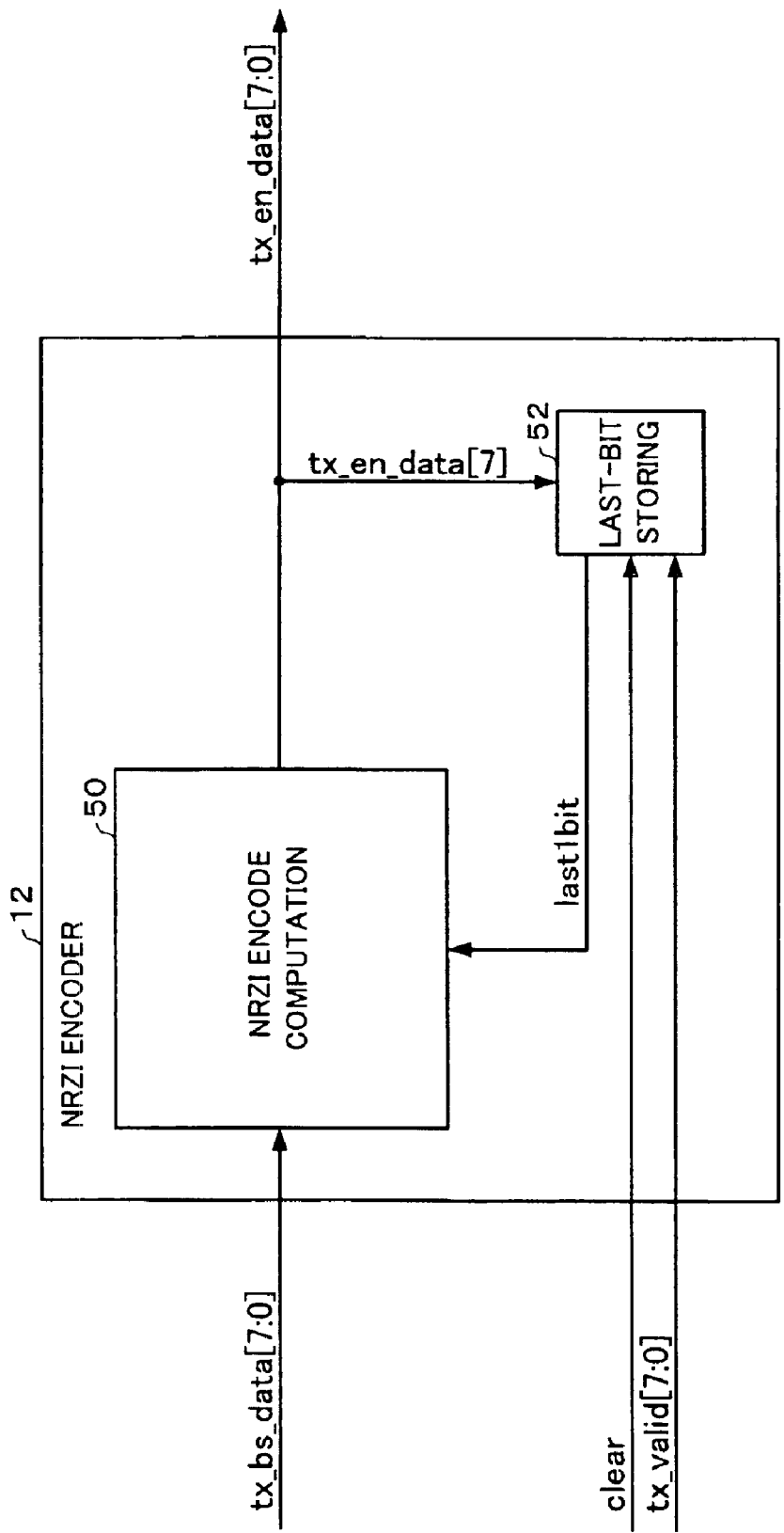
FIG. 21 is a diagram showing a configuration example of an NRZI encoder.

FIG. 21 shows a configuration example of an NRZI encoder 12 of FIG. 12.

The NRZI encoder 12 includes an NRZI encode computation circuit 50 and a last-bit storing circuit 52.

Herein, the NRZI encode computation circuit 50 is a circuit to receive the tx_bs_data from the front-staged bit stuffing circuit 10 and the last 1 bit from the last-bit storing circuit 52 and output encoded tx_en_data.

The last-bit storing circuit 52 stores a signal level in 1 bit at the last of tx_en_data and outputs it as last 1 bit to the NRZI encode computation circuit 50.

Incidentally, the last-bit storing circuit 52 is reset when the signal clear from the front-staged bit stuffing circuit 10 becomes active. This also stores 1 bit at the last of tx_en_data on condition that 1 stands in the signal tx_valid.

Figure 22:
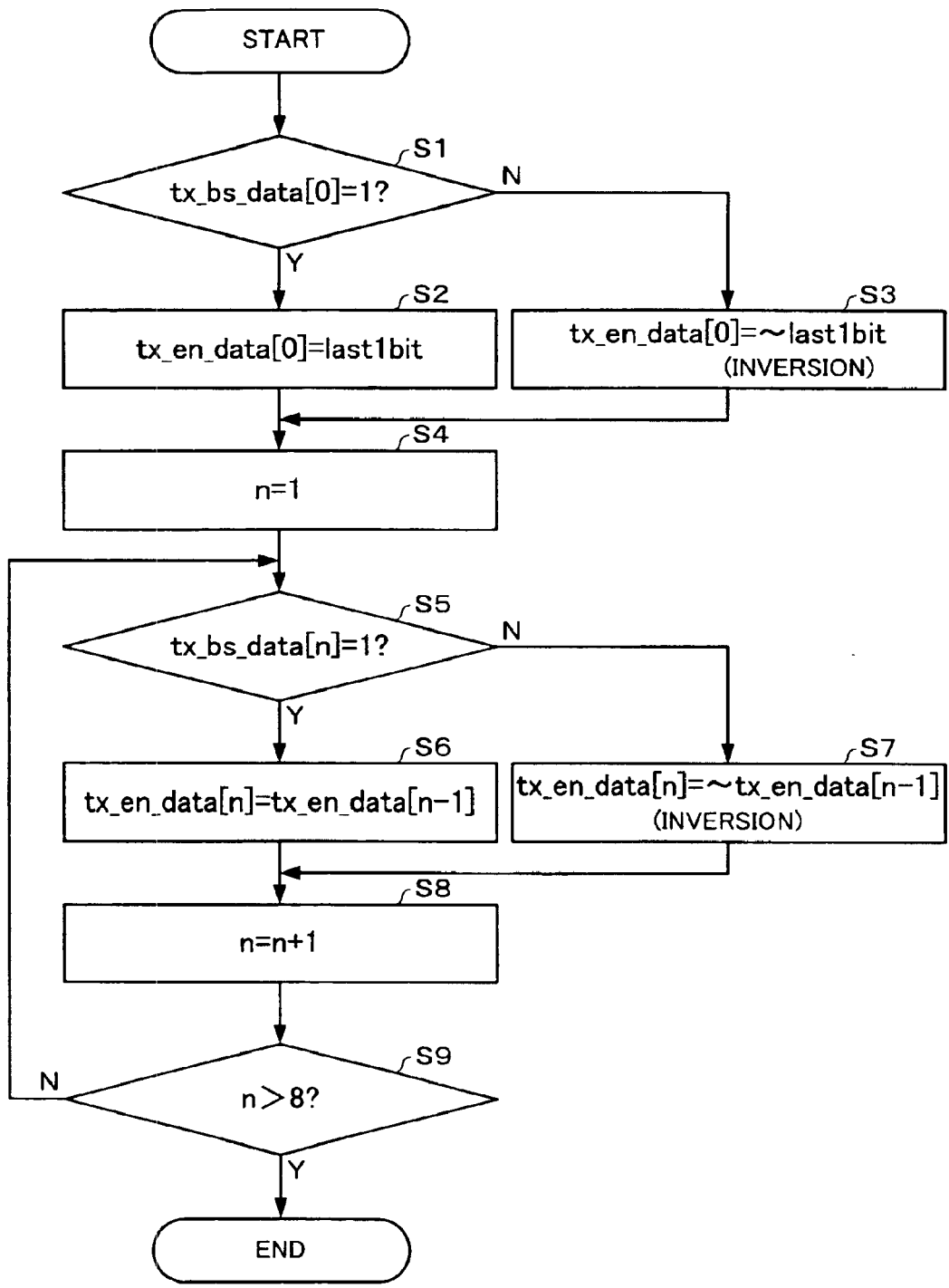
FIG. 22 is a flowchart for explaining the operation of the NRZI encoder.

FIG. 22 shows a flowchart representing the operation of the NRZI encode computation circuit 50.

First, judgement is made whether the tx_bs_data[0] (bit 0 of tx_bs_data) from the front-staged bit stuffing circuit 10 is 1 or not (step S1).

Figure 23:
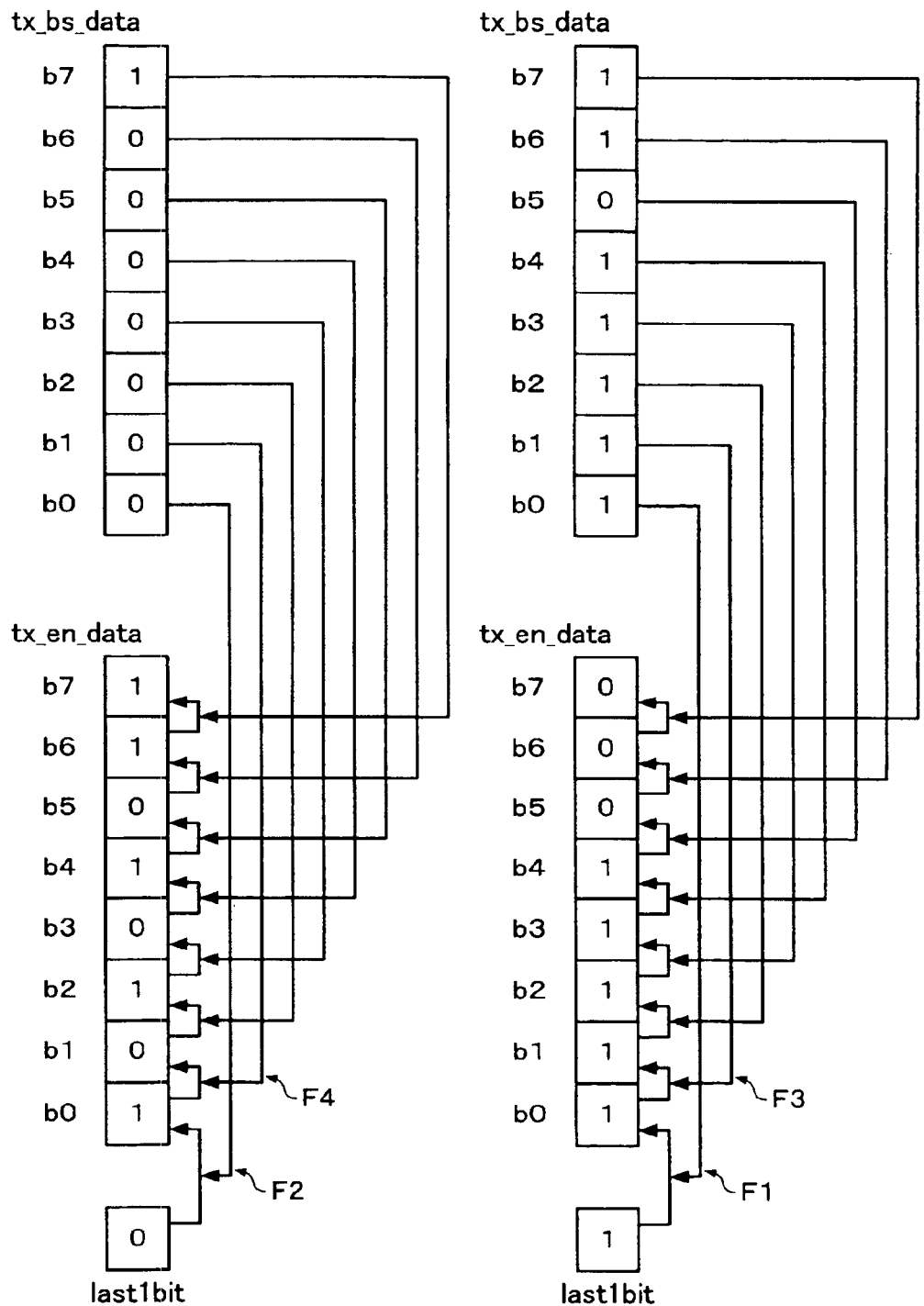
FIG. 23 is a diagram for explaining the operation of the NRZI encoder.

In the case of tx_bs_data[0]=1, the signal level of tx_en_data[0] is set at the same signal level as the last 1 bit (step S2). For example, at F1 in FIG. 23, because tx_bs_data[0]=1 and last 1 bit=1, tx_en_data[0]=1 (the same signal level as last 1 bit=1) results.

On the other hand, in the case of tx_bs_data[0]=0, the signal level of tx_en_data [0] is set to an inverted signal level to last 1 bit (step S3). For example, at F2 in FIG. 23, because tx_bs_data[0]=0 and last 1 bit=0, tx_en_data [0]=1 (inverted signal level to last 1 bit=0) results.

Next, setting is made as n=1 to judge whether tx_bs_data[n] is 1 or not (steps S4, S5).

If tx_bs_data[n]=1, the signal level of tx_en_data[n] is set to the same signal level of tx_en_data [n−] (step S6). For example, at F3 in FIG. 23, because tx_bs_data[1]=1 and tx_en_data[0]=1, tx_en_data[1]=1 (same signal level as tx_en_data[0]=1) results.

On the other hand, where tx_bs_data[n]=0, the signal level of tx_en_data[n] is set to the inverted signal level to tx_en_data[n1−] (step S7). For example, at F4 in FIG. 23, because tx_bs_data[1]=0 and tx_en_data[0]=1, tx_en_data[1]=0 (inverted signal level as tx_en_data[0]=1) results.

Next, n is incremented by one (step S8). Then, the process of steps S5 to S8 is repeated until n>8 is reached (step S9) thereby obtaining all the tx_en_data[n].

Figure 24:
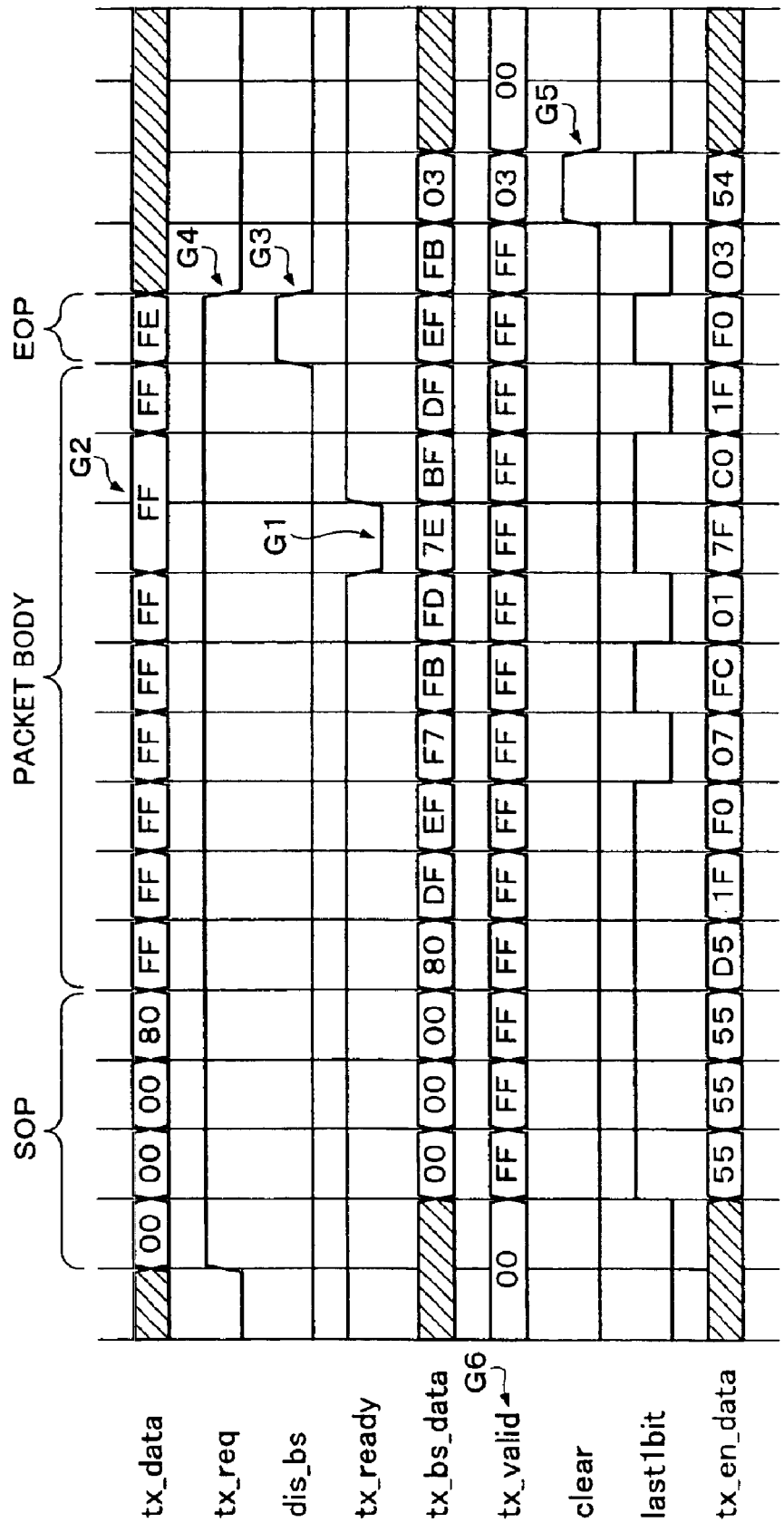
FIG. 24 is a waveform example of various signals inputted to and outputted from the bit stuffing circuit and NRZI encoder.

FIG. 24 shows waveform examples of various signals to be inputted to and outputted from the bit stuffing circuit 10 and NRZI encoder 14. Note that the tx_bs_data in FIG. 24 is sampled by a clock for waveform shaping into a signal delayed by 1 clock cycle from the tx_bs_data in FIG. 20.

As shown at G1, G2 in FIG. 24, if the overflow cumulative value reaches 8 or 9, the transmission ready signal tx_ready becomes inactive to suspend the input of tx_data for a 1 clock-cycle period (see E29, E30 and E31 in FIG. 20).

Meanwhile, as shown at G3 in FIG. 24, during the input of EOP=(FEh), dis_bs becomes active to prohibit bit stuffing.

Also, as shown at G4 and G5, after the lapse of 2 clock cycles from the change of a transmission request signal tx_req to the inactive, a signal clear becomes active thereby resetting the last-bit storing circuit 52 in FIG. 21.

Meanwhile, the signal tx_valid shown at G6 assumes 1 only while tx_bs_data is valid.

2.6 NRZI Decoder

Figure 25:
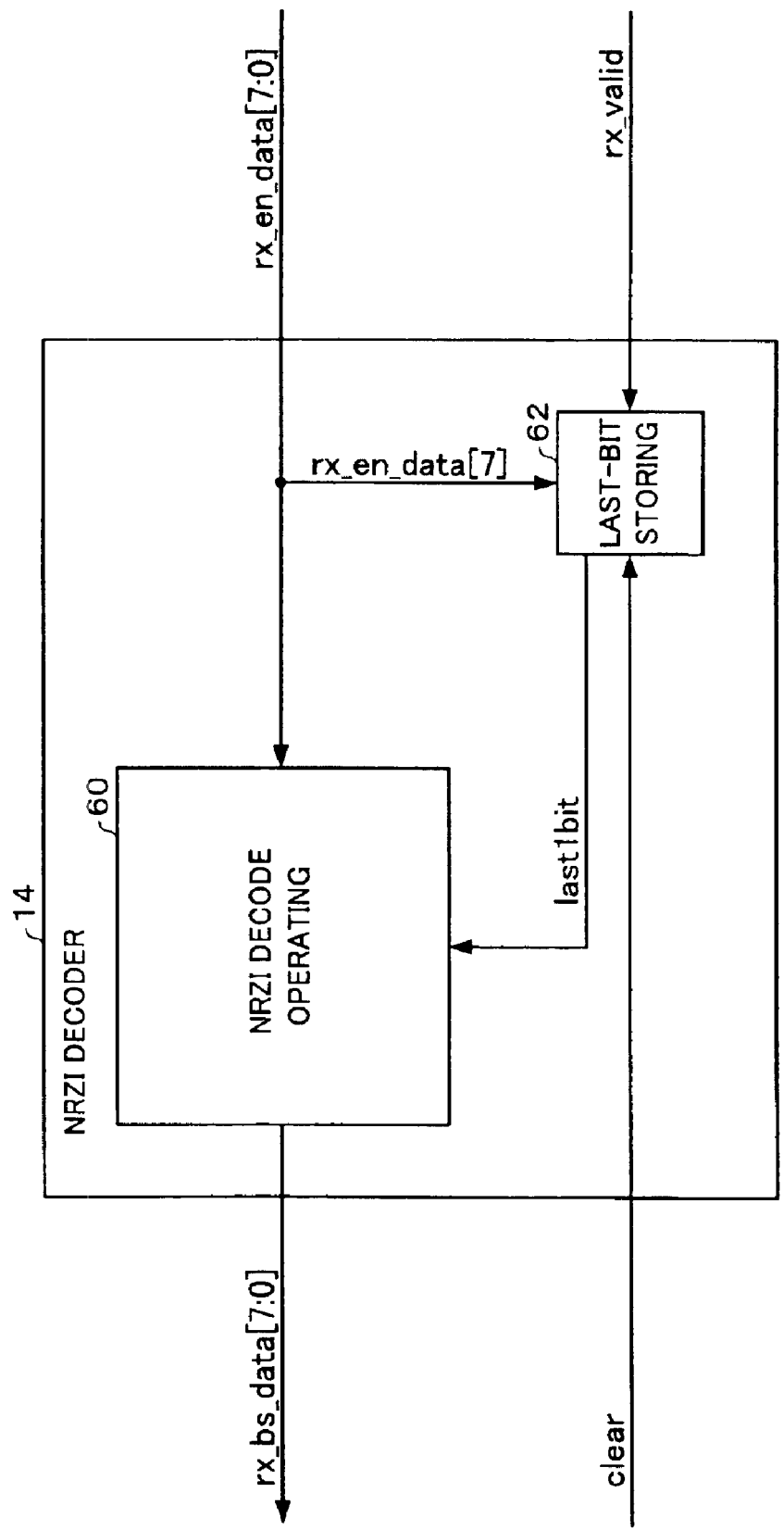
FIG. 25 is a diagram showing a configuration example of an NRZI decoder.

FIG. 25 shows a configuration example of the NRZI decoder 14 of FIG. 12.

The NRZI decoder 14 includes an NRZI decode computation circuit 60 and a last-bit storing circuit 62.

Herein, the NRZI decode computation circuit 60 is a circuit to receive the rx_en_data from the front-staged serial-parallel conversion circuit 19 and the last 1 bit from the last-bit storing circuit 62 to output decoded rx_bs_data.

The last-bit storing circuit 62 is a circuit to store a signal level of the last 1 bit of the rx_en_data and output it as last 1 bit to the NRZI decode computation circuit 60.

Note that the last-bit storing circuit 62 is reset when the signal clear becomes active. Also, it stores last 1 bit of the rx_en_data on condition that 1 stands in the signal rx_valid.

Figure 26:
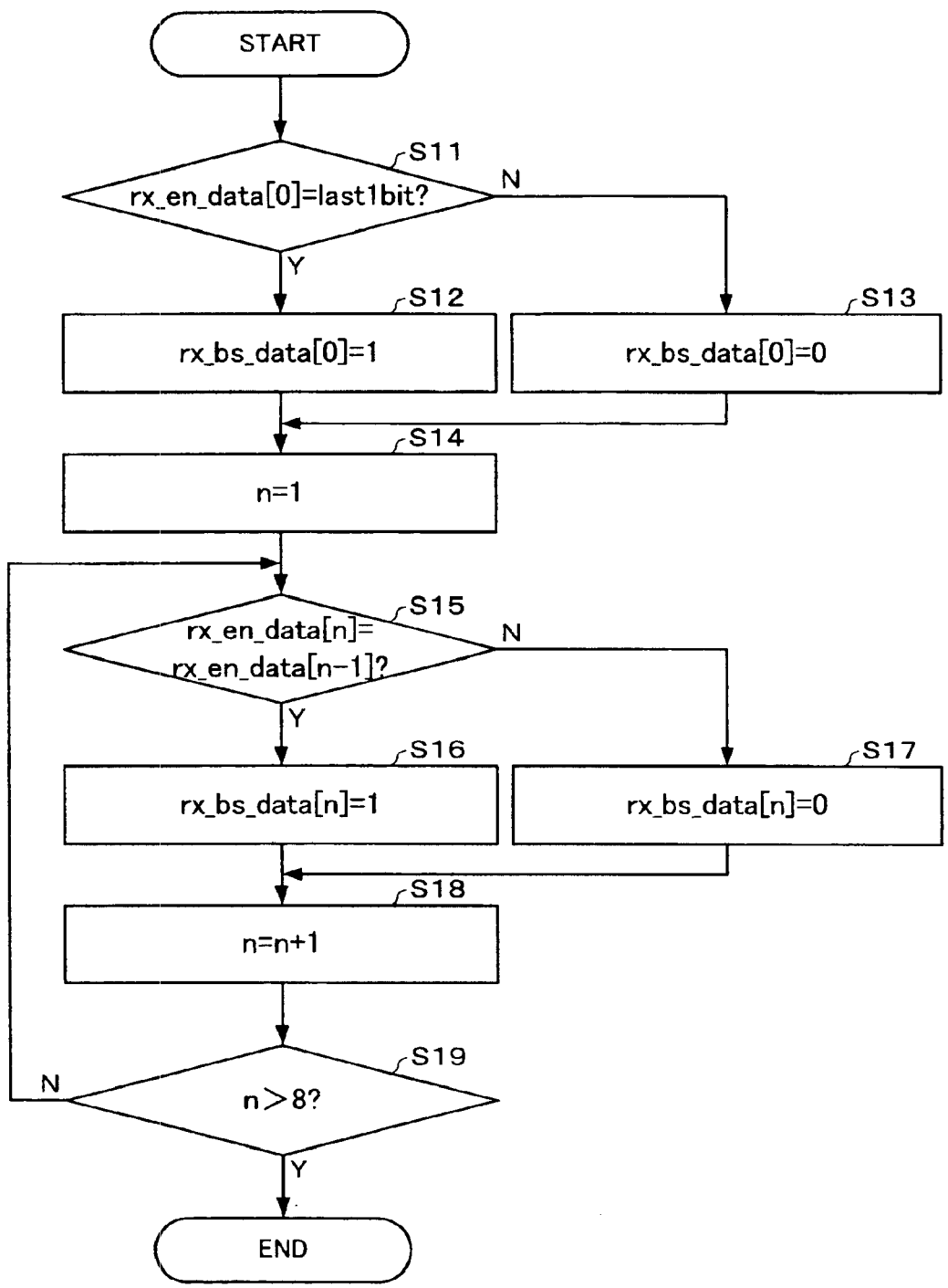
FIG. 26 is a flowchart for explaining the operation of the NRZI decoder.

FIG. 26 shows a flowchart representing the operation of the NRZI decode computation circuit 60.

First, judgement is made whether the signal level of the rx_en_data[0] (bit 0 of rx_en_data) from the front-staged serial-parallel conversion circuit 19 is equal to the signal level of the last 1 bit or not (step S11).

Figure 27:
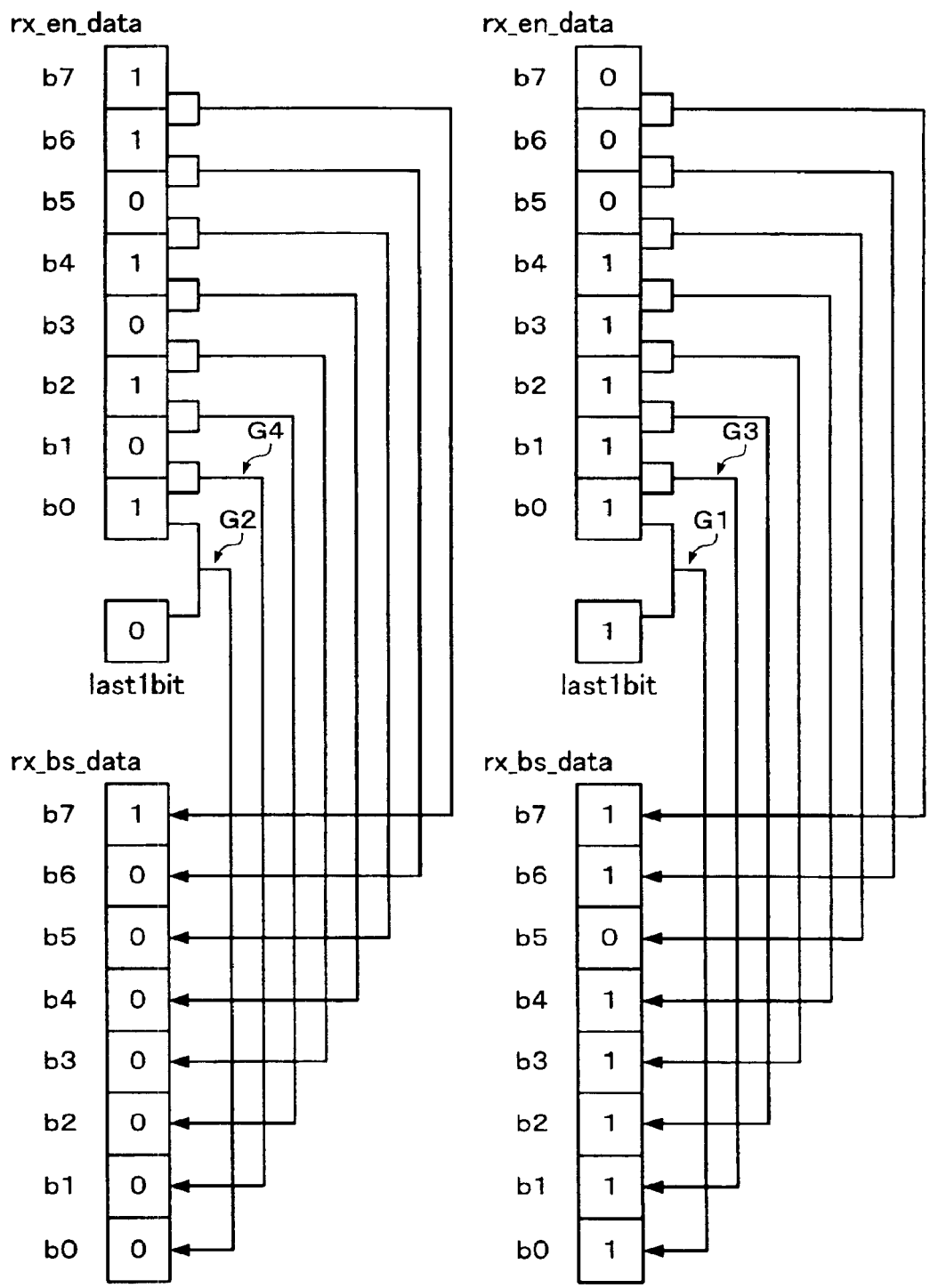
FIG. 27 is a diagram for explaining the operation of the NRZI decoder.

If the signal level of the rx_en_data [0] is equal to last 1 bit, rx_bs_data[0]=1 is made (step S12). For example, because at G1 in FIG. 27 rx_en_data[0]=last 1 bit=1, rx_bs_data[0]=1 results.

On the other hand, where the signal level of rx_en_data [0] is not equal to last 1 bit, rx_bs_data[0]=0 is made (step S13). For example, because at G2 in FIG. 27 rx_en_data [0]=1 and last 1 bit=0, rx_bs_data[0]=0 results.

Next, setting is made to n=1 to judge whether the signal level of rx_en_data[n] is equal to the signal level of rx_en_data[n−1] or not (step S14, S15).

Where the signal level of rx_en_data[n] is equal to the signal level of rx_en_data[n−1], rx_bs_data[n]=1 is made (step S16). For example, because at G3 in FIG. 27 rx_en_data [1]=rx_en_data[0]=1, rx_bs_data[1]=1 results.

On the other hand, where the signal level of rx_en_data [n] is not equal to the signal level of rx_en_data[n−1], rx_bs_data[n]=0 is made (step S17). For example, because at G4 in FIG. 27 rx_en_data[1]=0 and rx_en_data[0]=1, rx_bs_data[1]=0 results.

Next, n is incremented by one (step S18). Then, the process of steps S15 to S18 is repeated until N>8 is reached (step S19) thereby obtaining all of the rx_bs_data[n].

2.7 Bit Unstuffing Circuit

Figure 28:
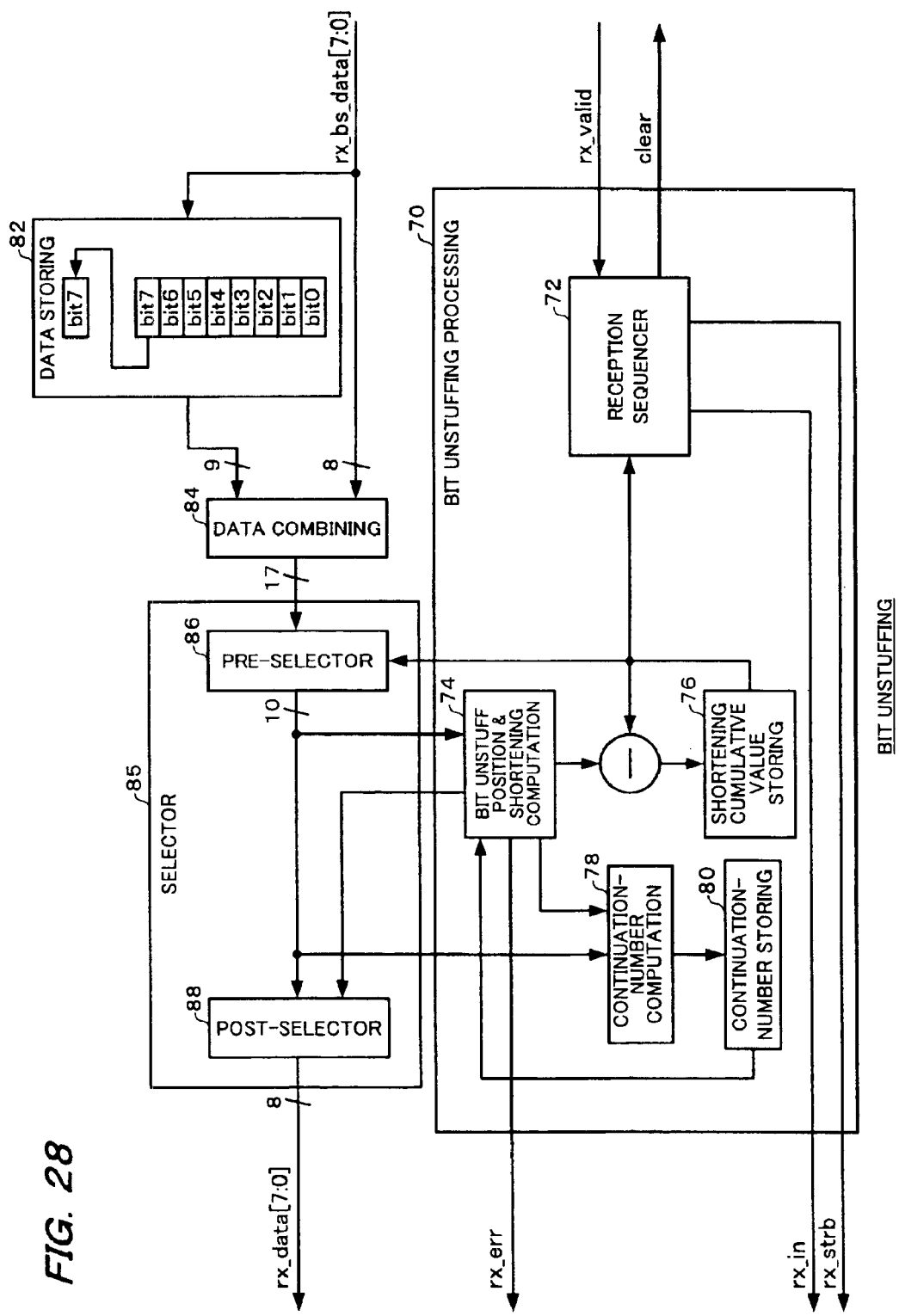
FIG. 28 is a diagram showing a configuration example of a bit unstuffing circuit (bit deleting circuit)

FIG. 28 shows a configuration example of the bit unstuffing circuit 16 of FIG. 12.

The bit unstuffing circuit 16 includes a bit unstuffing processing circuit 70, a data storing circuit 82, a data combining circuit 84 and a selector 85 having a pre-selector 86 (pre-shifter) and post-selector 88 (post-shifter).

Herein, the bit unstuffing processing circuit 70 is to carry out a process to carry over the deficient bits due to datalength shortening caused by bit deletion from the data in the next clock cycle, and includes a reception sequencer 72, a bit unstuffing position & shortening computation circuit 74, a shortening cumulative value storing circuit 76, a continuation-number computation circuit 78 and a continuation-number storing circuit 80.

The reception sequencer 72 generates various signals for bit unstuffing and reception processes. Specifically, this generates a control signal for each circuit block in the bit unstuffing processing circuit 70. Also, it receives a signal rx_valid from the front-staged serial-parallel conversion circuit 19 and outputs signals clear, rx_in and rx_strb.

The bit unstuffing position & shortening computation circuit 74 carries out a process to operate a bit unstuffing position (bit delete position in the second signal level) and the number of data-length shortened bits due to bit unstuffing (bit deletion).

The shortening cumulative value storing circuit 76 stores a shortening cumulative value obtained by cumulatively subtracting (or satisfactorily adding) from the initial value the number of shortened bits operated by the bit unstuffing position & shortening computation circuit 74.

The embodiment deletes the bit "0" inserted by bit stuffing at the transmission end, depending upon an operated bit unstuffing position. Also, the range of the rx_data to be outputted is determined depending upon the stored shortening cumulative value.

The continuation-number computation circuit 78 operates a continuation number to bit "1" at the last of the rx_data prior to bit unstuffing (a continuation number to bit "1" at the last of the data to be selected by the post-selector 88 of the outputs of the pre-selector 86). The continuation-number storing circuit 80 stores this continuation number.

The bit unstuffing position & shortening computation circuit 74 will operate a bit unstuffing position depending on the continuation-number to "1" at the last of storage in the continuation-number storing circuit 80 in precedent clock cycle.

The data storing circuit 82 is a circuit to store bit 7 (last bit) of the rx_bs_data precedent by 2 clock cycles and all the bits of the rx_bs_data precedent by 1 clock cycle. Note that, if necessary, stored may be all the bits of the rx_bs_data precedent by 2 clock cycles or part of or all the bits of the rx_bs_data precedent by 3–M (M>4) clock cycles.

The data combining circuit 84 combines together the bit 7 of the rx_bs_data precedent by 2 clock cycles stored in the data storing circuit 82 and all the bits of the rx_bs_data precedent by 1 clock cycle with all the bits of the rx_bs_ data in the current clock cycle, to output 17-bit width combined data.

The pre-selector 86 selects 10-bit width data from the 17-bit width combined data depending on the shortening cumulative value from the shortening cumulative value storing circuit 76 and outputs it to the post-selector 88.

The post-selector 88 receives the 10-bit width data from the pre-selector 86 and deletes bit "0" from the bit unstuffing position operated by the bit unstuffing position & shortening computation circuit 74, to output a bit-deleted 8-bit width rx_data.

Next, the operation of the circuit of FIG. 28 will be explained in detail by using FIG. 29.

Figure 29:
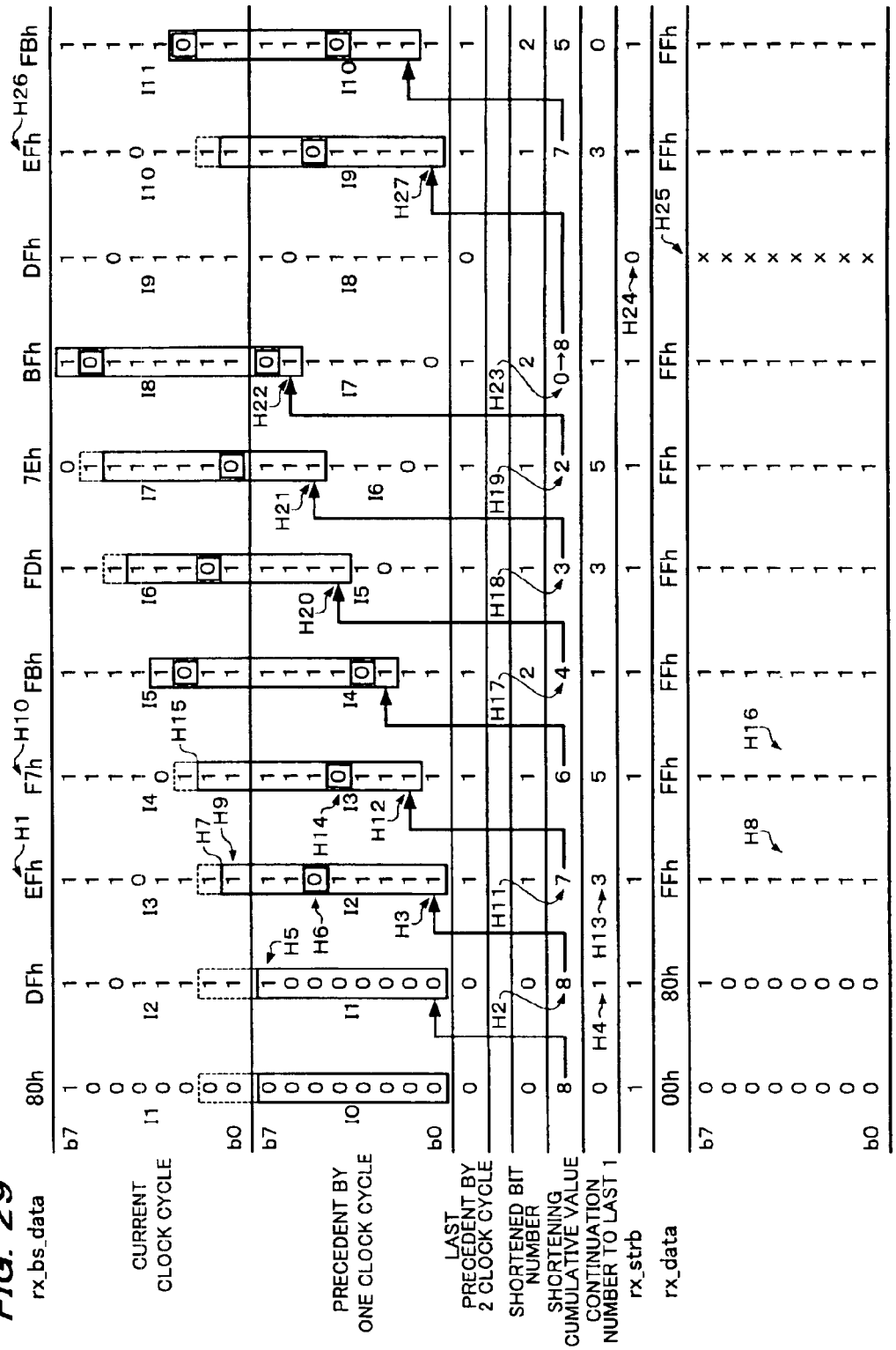
FIG. 29 is a diagram for explaining the operation of the bit unstuffing circuit.

For example, at H1 in FIG. 29, the data combining circuit 84 combines together I3=(EFh) as the rx_bs_data in the current clock cycle, I2=(DFh) precedent by 1 clock cycle and the last bit "1" of I1 precedent by 2 clock cycles, to output combined data thereof to the pre-selector 86.

At this time, the shortening cumulative value stored in the shortening cumulative value storing circuit 76 is 8 (initial value) as shown at H2 in FIG. 29. Consequently, the pre-selector 86 receiving the shortening cumulative value selects and outputs 10-bit width data having a top bit in a position shown at H3 from the combined data.

Meanwhile, the continuation number to the last "1" to be stored in the continuation-number storing circuit 80 is 1 as shown at H4, H5 in FIG. 29. Accordingly, the bit unstuffing position & shortening computation circuit 74 carries out a calculation of 6−1=5, and notifies the position shown at H6 as a bit unstuffing position to the post-selector 88.

Thereupon, the post-selector 88, receiving the 10-bit width data from the pre-selector 86 and the bit unstuffing position from the bit unstuffing position & shortening computation circuit 74, deletes bit "0" from a designated bit unstuffing position. Due to this, 8-bit width data (FFh) shown at H7 is outputted as rx_data, as shown at H8.

Note that, in this case, the deficient bit due to bit deletion shown at H9 is carried over from the data I3 in the next clock cycle to the data I2.

At H10 in FIG. 29, the data combining circuit 84 combines together I4=(F7h), I3=(EFh) and the last bit "1" of I2, to output a combined data to the pre-selector 86.

At this time, the shortening cumulative value is subtracted by one to have 7 as shown at H11. Accordingly, the pre-selector 86 selects and outputs 10-bit width data having a top bit in a position shown at H12 from the combined data.

Meanwhile, because the continuation number to the last "1" is 3 as shown at H13, the position shown at H14 is notified as a bit unstuffing position to the post-selector 88.

Thereupon, the post-selector 88 deletes bit "0" from a designated bit unstuffing position. This outputs (FFh) shown at H15 as rx_data, as shown at H16.

In the above manner, the bit-unstuffed rx_data is sequentially outputted in every clock cycle. Each time bit "0" is deleted due to bit unstuffing, the shortening cumulative value decreases, e.g. as shown at H17, H18 and H19. Due to this, the position of taking 10-bit width data changes as shown at H20, H21 and H22.

When the shortening cumulative value reaches 0 as shown at H23, the shortening cumulative value is initialized to 8 (in the case of 1, initialization is to 9). Thereupon, the reception sequencer 72 of FIG. 28 makes inactive the reception strobe signal rx_strb to be outputted to the rear-staged circuit only for 1 clock cycle period, as shown at H24 in FIG. 29. This suspends the fetching of rx_data only for 1 clock cycle period, as shown at H25.

In the next H26 clock cycle, because the shortening cumulative value is initialized to 8, 10-bit width data is taken from the position shown at H27.

With the above, the embodiment succeeds to take 10-bit width data from the combined data without contradiction even where the shortening cumulative value becomes 0 or 1 (given value).

Figure 30:
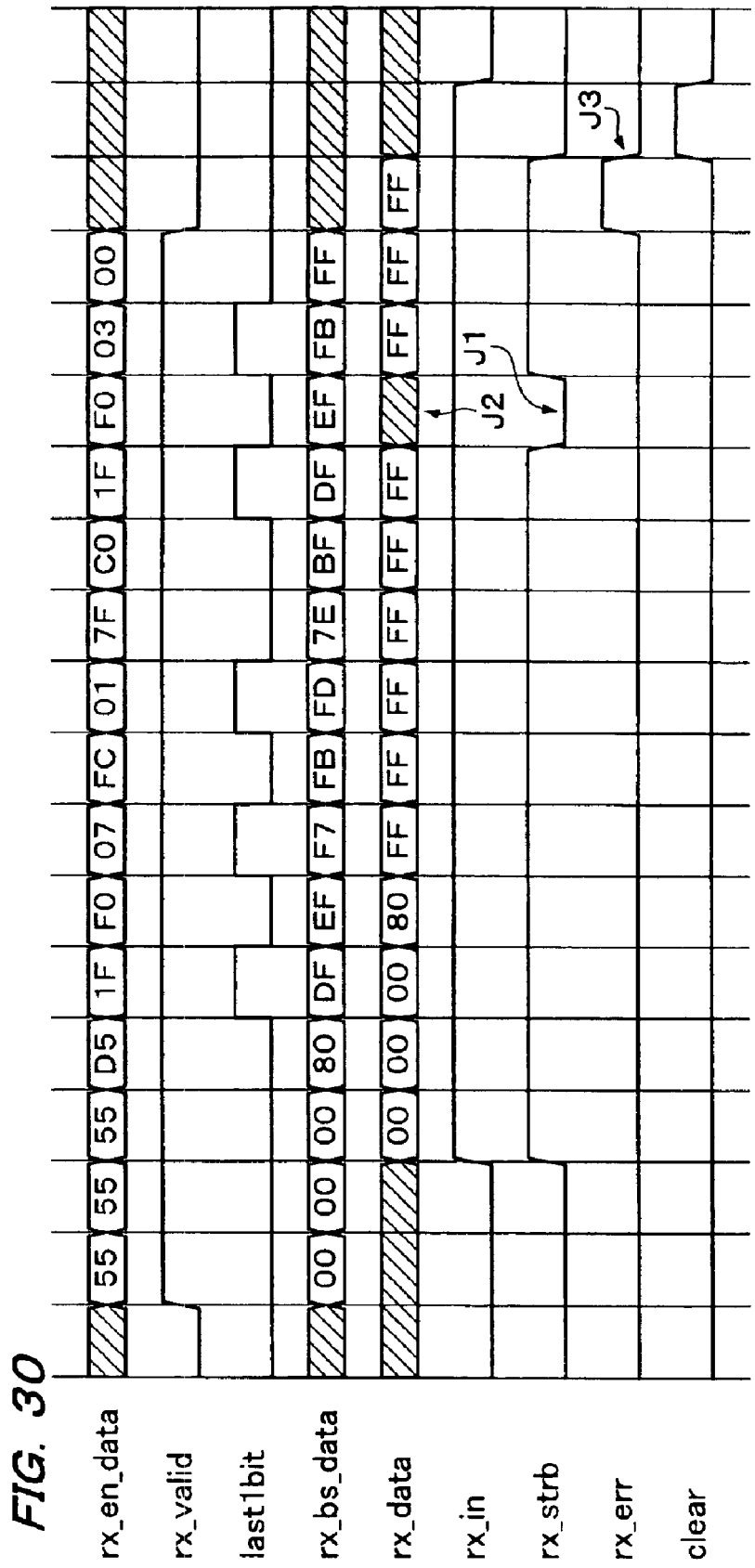
FIG. 30 is a waveform example of various signals inputted to and outputted from the bit unstuffing circuit and NRZI decoder.

FIG. 30 shows waveform examples of various signals inputted to and outputted from the NRZI decoder 14 and bit unstuffing circuit 16. Incidentally, the rx_data and rx_strb of FIG. 30 are signals delayed by 1 clock cycle from the rx_data and rx_strb of FIG. 29 because of being sampled by a clock in order for shaping the waveform.

As shown at J1 and J2 in FIG. 30, when the shortening cumulative value becomes 8 or 9, the reception strobe signal rx_strb is inactive to suspend rx_data fetching only for 1 clock cycle period (see H24 and H25 in FIG. 29).

Meanwhile, as was explained at G3 in FIG. 24, at the transmission end a bit stuffing process is not made to the EOP. Consequently, when receiving an EOP, bit stuffing error occurs at the reception end thus making the reception error signal rx_err active as shown at J3 in FIG. 30. Namely, the reception end detects a bit stuffing error thereby detecting an EOP.

3. Electronic Instrument

Now, explanation will be made on the examples of electronic instruments including a data transfer control device of the embodiment.

Figure 31A:
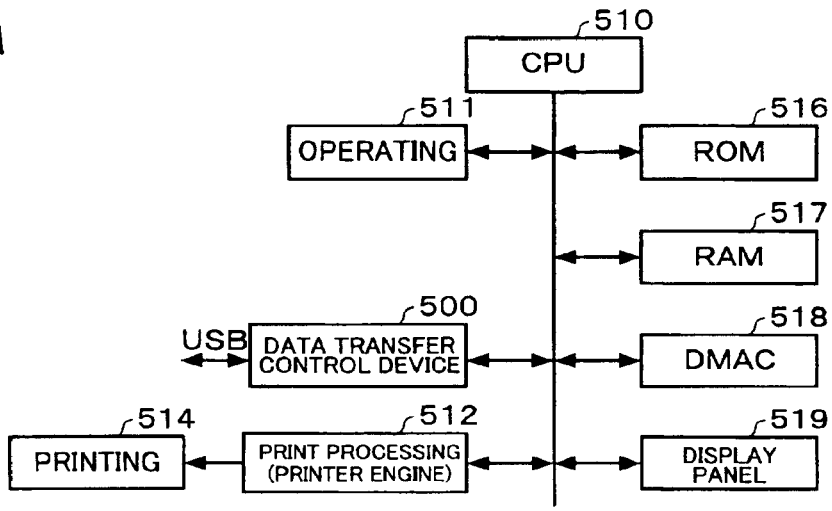
FIGS. 31A, 31B and 31C are internal block diagram of various electronic instruments.
Figure 32A:
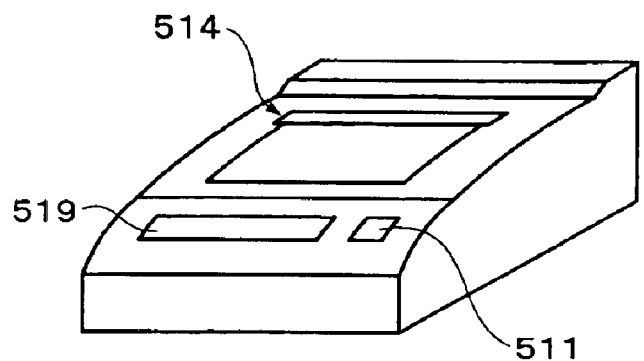
FIGS. 32A, 32B and 32C are examples of external views of various electronic instruments.

FIG. 31A shows an interior block diagram of a printer as an electronic instrument while FIG. 32A shows an outside view of the same. A CPU (microcomputer) 510 carries out system overall control and the like. An operating section 511 is for a user to operate the printer. A ROM 516 stores a control program, font and the like. A RAM 517 serves as a working area for the CPU 510. DMAC 518 is a DMA controller for data transfer not through the CPU 510. A display panel 519 is to notify a printer operating state to the user.

The serial printing data, sent from another device such as a personal computer through a USB, is converted into parallel printing data by a data transfer control device 500. The converted parallel printing data is sent to a print processing section (printer engine) 512 by the CPU 510 or DMAC 518. In the print processing section 512, a given process is made on the parallel printing data. Printing is made on a paper by a printing section (data output processing unit) 514 made by a print-head or the like, thus doing outputting.

Figure 31B:
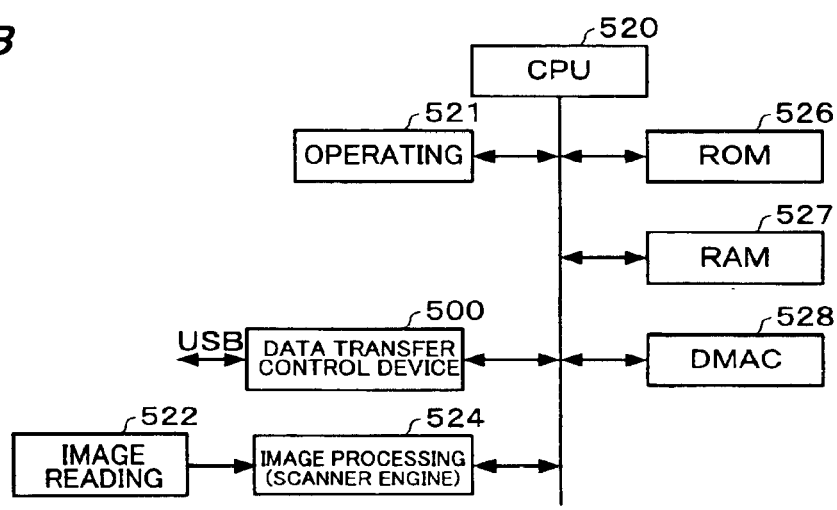
Figure 32B:
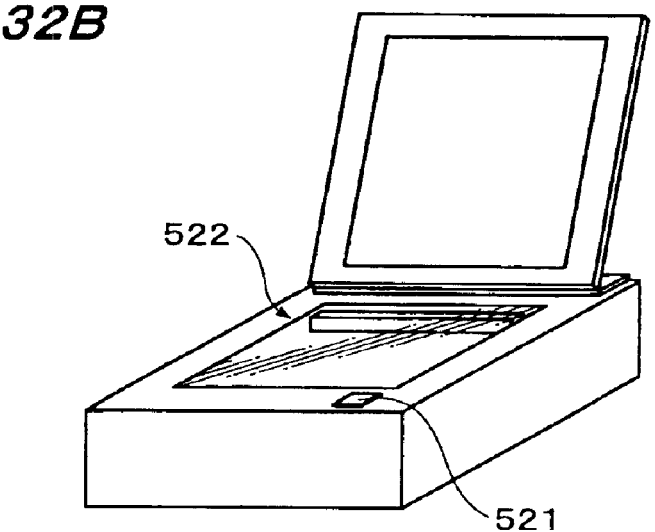

FIG. 31B shows an interior block diagram of a scanner as an electronic instrument while FIG. 32B shows an outside view of the same. A CPU 520 carries out system overall control and the like. An operating section 521 is for an user to operate the scanner. A ROM 526 stores a control program and the like. A RAM 527 serves as a working area for the CPU 520. DMAC 528 is a DMA controller.

The image on a paper is read by an image reading section (data taking unit) 522 formed by a light source, photoelectric converter or the like. The read image data is processed by an image processing section (scanner engine 524. The processed image data is sent to the data transfer control device 500 by the CPU 520 or DMAC 528. The data transfer control device 500 converts the parallel image data into serial data and transmits it to another device, such as a personal computer, through a USB.

Figure 31C:
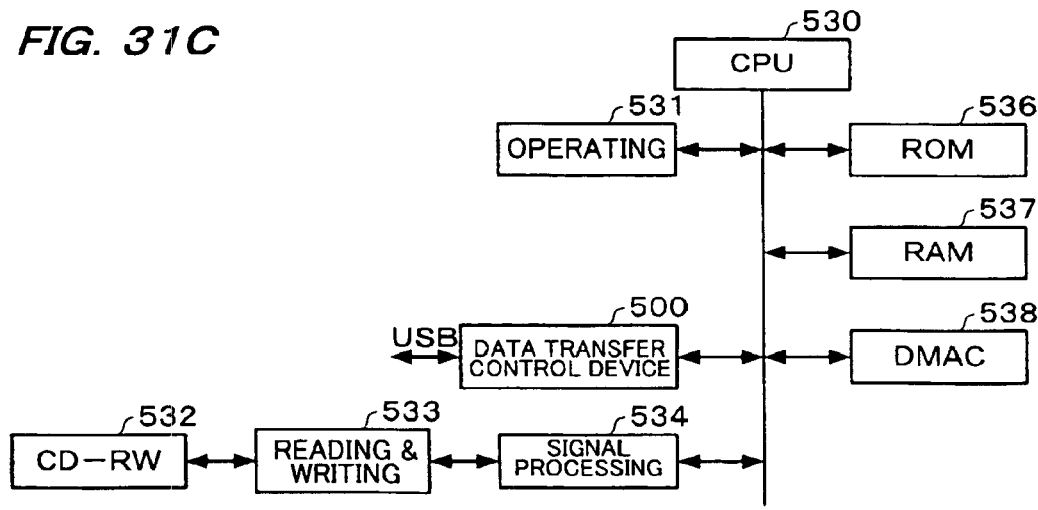
Figure 32C:
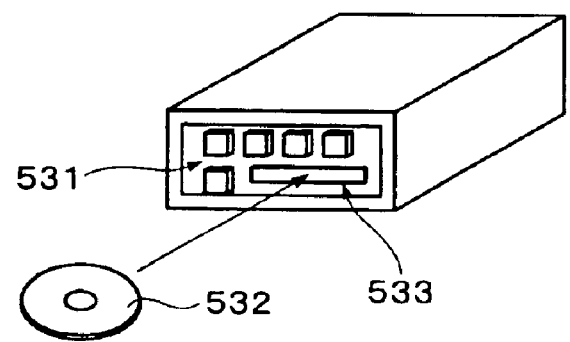

FIG. 31C shows an interior block diagram of a CD-RW drive as an electronic instrument while FIG. 32C shows an outside view of the same. A CPU 530 carries out system overall control and the like. An operating section 531 is for an user to operate the CD-RW. A ROM 536 stores a control program and the like. A RAM 537 serves as a working area for the CPU 530. DMAC 538 is a DMA controller.

The data, read out of the CD-RW 532 by a read & write section (data taking unit or data storage processing unit) 533 formed by a laser, motor or optical system, is inputted to a signal processing section 534 where it is subjected to a predetermined signal process such as error correction process. The signal-processed data is sent to the data transfer control device 500 by the CPU 530 or DMAC 538. The data transfer control device 500 converts the parallel data into serial data and transmits it to another device, such as a personal computer, through a USB.

On the other hand, the serial data sent from another device through a USB is converted by the data transfer control device 500 into parallel data. The parallel data is sent to the signal processing section 534 by the CPU 530 or DMAC 538. In the signal processing section 534, the parallel data is subjected to a given signal process and stored to the CD-RW 532 by the read & write section 533.

Incidentally, in FIG. 31A, 31B or 31C, besides the CPU 510, 520 or 530 a CPU may be separately provided for data transfer control in the data transfer control device 500.

The use of the data transfer control device of the embodiment in an electronic instrument makes possible HS-mode data transfer under the USB2.0. Accordingly, where the user makes printout instruction by a personal computer or the like, printing is completed with reduced time lag. Also, after image-taking instruction to the scanner, the user is allowed to see a read image with reduced time lag. Meanwhile, it is possible to carry out reading of data from and writing data to a CD-RW at high speed.

The use of the data transfer control device of the embodiment in an electronic instrument makes it possible to manufacture a data transfer control device IC by the usual semiconductor process cheap in manufacture cost. Accordingly, cost reduction can be achieved for the data transfer control device, and cost reduction can be achieved for the electronic instrument. Also, because high-speed operating parts can be reduced in data transfer control, the reliability of data transfer can be improved and the reliability of the electronic instrument can be improved.

It can be considered that the electronic instruments to which the data transfer control device of embodiment is applicable include, for example, various ones, e.g. optical disk drives in various kinds (CD-ROM, DVD), magneto-optical disk drives (MO), hard disk drives, TVs, VTRs, video cameras, audios, telephones, projectors, personal computers, electronic pocketbooks and word processors, besides the above.

Incidentally, the present invention is not limited to the embodiment but can be modified in various ways within the gist of the invention.

For example, the configuration of the data transfer control device of the invention is not limited to the configuration shown in FIGS. 1, 3 to 6 and 8 to 11 but possible to carry out various modifications.

Also, the given process to be made on a K-bit basis is not limited to USB bit stuffing, bit unstuffing, NRZI decode and NRZI encode but can be considered for various processes for data transfer in IEEE1394, SCSI or the like.

Also, although the embodiment explained mainly on the case of carrying out data transfer under the USB2.0, the invention is not limited to that. For example, the invention can be applied for data transfer in the standard based on the same idea as the USB2.0 or the standard developed from the USB2.0. Also, the application is possible for the data transfer under the standard of IEEE1394, SCSI or the like or the standard developed from IEEE1394, SCSI or the like.

What is claimed is:

1. A data transfer control device for data transfer through a bus, comprising:
   a first conversion circuit which converts K-bit width data transferred in a high-speed first transfer mode through a bus into data having an L-bit width (L>K) by rearranging;
   a first processing circuit which receives the L-bit width data from the first conversion circuit and carries out a K-bit based process on an L-bit basis at a second frequency which is lower than a first frequency of the first transfer mode;
   a second processing circuit which processes on a K-bit basis a K-bit width data transferred in a low-speed second transfer mode through a bus; and
   a second conversion circuit which converts the K-bit width data from the second processing circuit into data having an L-bit width.

2. The data transfer control device as defined in claim 1, wherein the first conversion circuit includes:
   a data holding circuit which receives and holds data inputted at the first frequency;
   a judging circuit which judges whether or not the data held in the data holding circuit is valid, by unit of a data cell configured of a plurality of bits; and
   a circuit which receives data of a data cell from the data holding circuit and outputs the data of a data cell that has bee judged to be valid at the second frequency which is lower than the first frequency.

3. The data transfer control device as defined in claim 1, wherein data transfer is carried out according to the universal serial bus (USB) standard.

4. The data transfer control device as defined in claim 1, the first processing circuit and the second processing circuit performing bit unstuffing processing which removes from the received data a second level bit that is inserted when a first level bit continues predetermined times.

5. A data transfer control device for data transfer through a bus, comprising:
   a first conversion circuit which converts K-bit width data transferred in a high-speed first transfer mode through a bus into data having an L-bit width (L>K) by rearranging;
   a second conversion circuit which converts K-bit width data transferred in a low-speed second transfer mode through a bus into data having an L-bit width by rearranging;
   a selection circuit which selects and outputs one of an output from the first conversion circuit and an output from the second conversion circuit; and
   a processing circuit which receives the L-bit width data from the selection circuit and performs a K-bit based process on an L-bit basis at a second frequency which is lower than a first frequency of the first transfer mode.

6. A data transfer control device as defined in claim 5, wherein the first conversion circuits includes:
   a data holding circuit which receives and holds data inputted at the first frequency;
   a judging circuit which judges whether or not the data held in the data holding circuit is valid, by unit of a data cell configured of a plurality of bits; and
   a circuit which receives data of a data cell from the data holding circuit and outputs the data of a data cell that has been judged to be valid at the second frequency which is lower than the first frequency.

7. The data transfer control device as defined in claim 5, wherein data transfer is carried out according to the universal serial bus (USB) standard.

8. A data transfer control device for data transfer through a bus, comprising:
- a first conversion circuit which converts K-bit width data transferred at a first frequency through a bus into data having an L-bit width (L>K) by rearranging;
- a processing circuit which receives the L-bit width data from the first conversion circuit and carries out an M-bit based process (L>M>K) on an L-bit basis at a second frequency which is lower than the first frequency; and
- a second conversion circuit which receives the L-bit width data from the processing circuit and converts the L-bit width data into data having an M-bit width by rearranging.

9. A data transfer control device as defined in claim 8, wherein the first conversion circuits includes:
- a data holding circuit which receives and holds data inputted at the first frequency;
- a judging circuit which judges whether or not the data held in the data holding circuit is valid, by unit of a data cell configured of a plurality of bits; and
- a circuit which receives data of a data cell from the data holding circuit and outputs the data of a data cell that has been judged to be valid at the second frequency which is lower than the first frequency.

10. The data transfer control device as defined in claim 8, wherein data transfer is carried out according to the universal serial bus (USB) standard.

11. An electronic instrument comprising:
- the data transfer control device as defined in claim 1; and
- a device which performs output processing, taking processing or storing processing of data transferred through the data transfer control device or the bus.

12. An electronic instrument comprising:
- the data transfer control device as defined in claims 5; and
- a device which performs output processing, taking processing or storing processing of data transferred through the data transfer control device or the bus.

13. An electronic instrument comprising:
- the data transfer control device as defined in claim 8; and
- a device which performs output processing, taking processing or storing processing of data transferred through the data transfer control device or the bus.

* * * * *